United States Patent [19]
Obara et al.

[11] Patent Number: 6,070,980
[45] Date of Patent: Jun. 6, 2000

[54] SPECTACLE LENS

[75] Inventors: Yoshimi Obara; Moriyasu Shirayanagi, both of Tokyo, Japan

[73] Assignee: Asahi Kogaku Kogyo Kabushiki Kaisha, Tokyo, Japan

[21] Appl. No.: 09/056,908

[22] Filed: Apr. 8, 1998

[30] Foreign Application Priority Data

Apr. 8, 1997 [JP] Japan ................................. 9-089765

[51] Int. Cl.⁷ ....................................................... G02C 7/02
[52] U.S. Cl. ................................................ 351/159; 351/41
[58] Field of Search ........................... 351/159, 41, 158, 351/168; 359/558, 563

[56] References Cited

U.S. PATENT DOCUMENTS

| | | | |
|---|---|---|---|
| 4,210,391 | 7/1980 | Cohen | 351/161 |
| 4,655,565 | 4/1987 | Freeman | 351/159 |
| 5,148,314 | 9/1992 | Chen | 359/642 |
| 5,384,606 | 1/1995 | Koch et al. | 351/159 |
| 5,446,588 | 8/1995 | Missig et al. | 359/645 |

FOREIGN PATENT DOCUMENTS

| | | |
|---|---|---|
| 60-203913 | 10/1985 | Japan. |
| 4-50813 | 2/1992 | Japan. |
| 7-28002 | 1/1995 | Japan. |
| 7-49471 | 2/1995 | Japan. |

*Primary Examiner*—Georgia Epps
*Assistant Examiner*—Jordan M. Schwartz
*Attorney, Agent, or Firm*—Pitney, Hardin, Kipp and Szuch LLP

[57] ABSTRACT

Disclosed is a spectacle lens which includes a diffractive structure for producing diffraction to correct transverse chromatic aberration caused by a macroscopic surface shape of the spectacle lens. The diffractive structure is composed of a series of rings formed integral with the spectacle lens.

16 Claims, 34 Drawing Sheets

SPECTACLE LENS

BACKGROUND OF THE INVENTION

1. Field of the Invention

The present invention relates to a spectacle lens that is designed to reduce chromatic aberration.

2. Description of the Related Art

A spectacle lens is generally formed as a single lens element, so that chromatic aberration as an optical lens defect that is caused by the spectacle lens cannot be appropriately corrected to a negligible degree. In spectacle lenses, the occurrence of transverse chromatic aberration is a fundamental problem. Due to the occurrence of transverse chromatic aberration, the wearer of the spectacles can see color fringes when he or she sees things through peripheral portions of the lenses. Such a problem occurs since light rays coming in the same direction enter each eye of the wearer as if the light rays were coming in different directions depending on the differences in wavelength (red R, green G and blue B) as shown in FIG. 32. In FIG. 32 L and E represent a spectacle lens and an eye ball, respectively. When a single lens such as a spectacle lens is designed such that chromatic aberration is reduced without the use of any additional lens, using a lens material whose dispersive power is as small as possible (i.e., whose Abbe number is as large as possible) was formerly the only way to reduce chromatic aberration.

A crown glass or an optical plastic CR-39, whose Abbe number is approximately 60, is conventionally used as a material for making spectacle lenses. A glass material whose Abbe number is 60 can be said to have a small dispersive power. However, in the case where such a glass material is used for making a spectacle lens having a large diopter, color fringes seen through a peripheral portion of the lens becomes very apparent, and can become distracting.

In FIG. 33, the broken line shows chromatic aberration (chromatic aberration of magnification) in the case of viewing through a conventional specific spectacle lens (first prior art) in a direction with a visual angle of 50 degrees. This conventional spectacle lens is made of CR-39 (Abbe number: 60); refractive power: 1.50) and has a vertex power of −8.00 (diopter). The horizontal axis represents wavelength λ (nm) while the vertical axis represents the angle of deviation (dθ) from the incident angle (θ) of a reference wavelength (G).

In recent years various optical plastic materials having a high refractive index have been produced for the purpose of making spectacle lenses thin and light-weight. However, in the case where an optical plastic material having a high refractive index is used for making a lens, the dispersive power of the lens tends to be large, i.e., the Abbe number of the lens tends to be small. Therefore, in order to reduce chromatic aberration it is not preferable that an optical plastic material having a high refractive index be used for making spectacle lenses.

In FIG. 33, the solid line shows chromatic aberration (chromatic aberration of magnification) in the case of viewing through another conventional spectacle lens (second prior art) in a direction with a visual angle of 50 degrees. This conventional spectacle lens is made of a polyurethane plastic material having a high refractive index (Abbe number: 32; refractive power: 1.66) and has a vertex power of −8.00 (diopter).

In FIG. 34, the broken line shows chromatic aberration (chromatic aberration of magnification) in the case of viewing through yet another conventional spectacle lens (third prior art) in a direction with a visual angle of 50 degrees. This conventional spectacle lens is made of CR-39 (Abbe number: 60; refractive power: 1.50) and has a vertex power of +4.00 (diopter). The horizontal axis represents wavelength λ (nm) while the vertical axis represents the angle of deviation (dθ) from the incident angle (θ) of a reference wavelength (G).

In FIG. 34, the solid line shows chromatic aberration (chromatic aberration of magnification) in the case of viewing through yet another conventional spectacle lens (fourth prior art) in a direction with a visual angle of 50 degrees. This conventional spectacle lens is made of a polyurethane plastic material having a high refractive index (Abbe number: 32; refractive power: 1.6) and has a vertex power of +4.00 (diopter).

Japanese laid-open patent publication No. 7-28002 has disclosed a technique for reducing chromatic aberration such as mentioned above. According to the technique, a spectacle lens is made of a composite lens consisting of a plurality of lenses having different Abbe numbers. However, such a composite lens is thick and heavy, which is undesirable for spectacles.

Japanese laid-open patent publication No. 60-203913 has disclosed another technique utilizing the effect of diffraction for reducing chromatic aberration caused by an overall optical system including a spectacle lens and a corresponding eye of the user. However, the technique is referred to only longitudinal chromatic aberration, whereas transverse chromatic aberration, a fundamental problem to be overcome in spectacle lenses as mentioned above, is not dealt with.

Japanese laid-open patent publication No. 7-49471 and some other publications have disclosed various techniques utilizing effect of diffraction for making a multifocal spectacle lens, a multifocal contact lens or a multifocal intraocular lens. However, the refractive power of a lens due to diffraction depends largely on the wavelength of light ray passing through the lens, and also the degree of the dependency varies according to the variation in the order of diffraction. Therefore, there is a drawback in that the chromatic aberration (chromatic aberration of magnification) increases as the order of diffraction of the lens becomes large. Longitudinal chromatic aberration is a fundamental problem in the case of contact lenses and intraocular lenses while transverse chromatic aberration is a fundamental problem in the case of spectacle lenses. However, any method or technique for reducing chromatic aberration is not taught in any of the aforementioned publications at all, including Japanese laid-open patent publication No. 7-49471.

Japanese laid-open patent publication No. 64-50012 has disclosed a technique for making the front surface of a lens to be a rotationally-symmetrical aspherical surface so as to reduce the weight and thickness of the lens. The aforementioned spectacle lens as the second prior art is provided on a front surface thereof with such a rotationally-symmetrical aspherical surface. Table 1 below shows the specification of the spectacle lens.

TABLE 1

| | |
|---|---|
| Vertex power: | SPH −8.00 (diopter) |
| Paraxial radius of curvature of front surface: | R1 620.336 (mm) |
| Aspherical factor of front surface: | K 0.000 |
| | A4 $2.299 \times 10^{-7}$ |
| | A6 $-1.594 \times 10^{-10}$ |

TABLE 1-continued

| | |
|---|---|
| | A8 6.101 × $10^{-14}$ |
| | A10 −1.210 × $10^{-17}$ |
| Radius of curvature of rear surface: | R2 73.223 (mm) |
| Optical center thickness: | tc 1.100 (mm) |
| Refractive index: | n 1.660 |
| Diameter: | ø 75.000 (mm) |
| Rim thickness: | te 9.975 (mm) | wherein the shape of a rotationally-symmetrical aspherical surface is defined by the following equation:

$$X = Ch^2/\{1+[1-(1+K)C^2h^2]^{1/2}\} + A4h^4 + A6h^6 + A8h^8 + A10h^{10} +$$

wherein:
h designates a distance from the optical axis;
X designates a distance from a tangent plane of an aspherical vertex;
C designates a curvature of the aspherical vertex (1/r),
K designates a conic constant;
A4 designates a fourth-order aspherical factor;
A6 designates a sixth-order aspherical factor;
A8 designates a eighth-order aspherical factor; and
A10 designates a tenth-order aspherical factor.

The rim thickness (=9.975 mm) of this spectacle lens of Table 1 is smaller than the rim thickness (=10.734 mm) of a regular spherical lens having no aspherical surface (R1=305.720, R2=64.845). However, the rim thickness of this spectacle lens of Table 1 cannot be said to be sufficiently small.

The aforementioned spectacle lens as the fourth prior art is provided on a front surface thereof with a rotationally-symmetrical aspherical surface such as mentioned above. Table 2 below shows the specification of the spectacle lens.

TABLE 2

| | |
|---|---|
| Vertex power: | SPH +4.00 (diopter) |
| Paraxial radius of curvature of front surface: | R1 139.395 (mm) |
| aspherical factor of front surface: | K 0.000 |
| | A4 −5.518 × $10^{-7}$ |
| | A6 1.521 × $10^{-10}$ |
| | A8 −3.719 × $10^{-14}$ |
| | A10 5.176 × $10^{-18}$ |
| Radius of curvature of rear surface: | R2 795.455 (mm) |
| Optical center thickness: | tc 4.700 (mm) |
| Refractive index: | n 1.660 |
| Diameter: | ø 75.000 (mm) |
| Rim thickness: | te 1.231 (mm) |

The optical center thickness (=4.700 mm) of this spectacle lens of Table 2 is smaller than the optical center thickness (=5.823 mm) of a regular spherical lens having no aspherical surface (R1=70.000, R2=114.761, te=1.231, θ=75). However, the optical center thickness of this spectacle lens of Table 2 cannot be said to be sufficiently small.

SUMMARY OF THE INVENTION

The primary object of the present invention is to provide a thin and light-weight spectacle lens causing less transverse chromatic aberration.

To achieve the object mentioned above, according to an aspect of the present invention, there is provided a spectacle lens which includes a diffractive structure for producing diffraction to correct transverse chromatic aberration caused by a macroscopic surface shape of the spectacle lens, wherein the diffractive structure includes a series of rings formed integral with the spectacle lens.

Providing that the Abbe number of a material of which the spectacle lens is made and the prism power at any one point on the series of rings within a radius of at least 30 mm about the geometric center of the spectacle lens are represented by υ and P (prism diopter), respectively, a pitch p(mm) of the series of rings preferably satisfies the following condition (1):

$$p < 0.04\upsilon/|P| \qquad (1).$$

Preferably, the spectacle lens is a single-vision lens, wherein the series of rings are formed as a series of concentric rings, and further wherein a pitch p(mm) of the concentric rings at any one point on the series of concentric rings within a distance h of at least 30 mm from an optical axis of the spectacle lens satisfies the following condition (2):

$$p < 0.4\upsilon/|D \times h| \qquad (2),$$

wherein: υ represents the Abbe number of a material of which the spectacle lens is made, and D represents the vertex power (diopter) of the spectacle lens along a cross section including the any one point and the optical axis.

Preferably, the pitch p(mm) satisfies the following condition (3):

$$p > 0.005 \qquad (3).$$

Preferably, the Abbe number υ satisfies the following condition (4):

$$\upsilon < 45 \qquad (4).$$

Preferably, the optical material is plastic.

Preferably, the diffractive structure is formed such that a stepped surface which includes a series of annular steps respectively forming the series of rings is formed microscopically on at least one of front and rear surfaces of the spectacle lens. Namely, the diffractive structure is preferably formed as a surface relief diffractive structure on at least one of front and rear surfaces of the spectacle lens.

Preferably, the diffractive structure is formed as a layer having a predetermined refractive index profile.

Preferably, the diffractive structure is formed as a layer having a periodic transmittance to produce diffraction.

In the case where the diffractive structure is formed as the surface relief diffractive structure, the diffractive structure can be formed on either the front or rear surface of the spectacle lens. In the case where the diffractive structure is formed as the surface relief diffractive structure and where the diffractive structure is formed on the front surface of the spectacle lens, providing that the incident angle of a light ray incident on the front surface at any one point thereon within a radius of at least 30 mm about the geometric center of the spectacle lens is represented by θ (°); that the angle of refraction of a light ray refracted through the front surface at the any one point thereon is represented by θ' (°); and that the height of a rise of one of the series of annular steps at the any one point in a direction of a normal extending from an annular surface of the one of the series of annular steps is represented by Δ (mm), for any one of light rays having a wavelength λ (mm) within a range of 5×$10^{-4}$ through 6×$10^{-4}$; the following equation (5) is preferably satisfied:

$$\Delta = |\lambda/(\cos\theta - n_\lambda \cos\theta')| \qquad (5),$$

wherein $n_\lambda$ represents the refractive index of a lens material of the spectacle lens relative to the wavelength λ.

Furthermore, in the case where the diffractive structure is formed as the surface relief diffractive structure and where the diffractive structure is formed on the front surface of the spectacle lens, it is preferable that the spectacle lens be a single-vision lens, wherein providing, at any one point on the front surface within a radius h of at least 30 mm about the geometric center of the spectacle lens, that the angle of a normal extending from an annular surface of one of the series of annular steps on the front surface at the any one point thereon relative to an optical axis of the spectacle lens is represented by $\gamma$ (°) and that the height of a rise of one of the series of annular steps at the any one point in a direction of the normal is represented by $\Delta$ (mm), for any one of light rays having a wavelength $\lambda$ (mm) within a range of $5\times10^{-4}$ through $6\times10^{-4}$; the following conditions (6) and (7) are satisfied:

$$|\lambda/[\cos\psi - n_{80}\cos\{\sin^{-1}(\sin\psi/n_{80})\}]| - 1\times10^{-5}\times h < \Delta \quad (6)$$

$$\Delta < |\lambda/[\cos\psi - n_{80}\cos\{\sin^{-1}(\sin\psi/n_{80})\}]| + 1\times10^{-5}\times h \quad (7)$$

wherein $\psi$ is expressed by the following equation (8):

$$\psi = \tan^{-1}(h/25) - 180Dh/1000\pi - \gamma \quad (8), \text{ and}$$

wherein:

$n_{80}$ represents the refractive index of a lens material of the spectacle lens relative to the wavelength $\lambda$, and D represents the vertex power (diopter) of the spectacle lens along a cross section including the any one point and the optical axis. In the case where the spectacle lens is a negative lens, the series of annular steps are preferably formed such that each of rises of the series of annular steps extends to decrease the thickness of the spectacle lens in a radial direction from an innermost annular step toward an outermost annular step of the series of annular steps. In another case where the spectacle lens is a positive lens, the series of annular steps are preferably formed such that each of rises of the series of annular steps extends to increase the thickness of the spectacle lens in a radial direction from an innermost annular step toward an outermost annular step of the series of annular steps.

In the case where the diffractive structure is formed as the surface relief diffractive structure and where the diffractive structure is formed on the rear surface of the spectacle lens, providing that the angle of a light ray incident on the rear surface at any one point thereon within a radius of at least 30 mm about the geometric center of the spectacle lens from the inside of the spectacle lens is represented by $\theta'$ (°); that the exit angle of a light ray emergent from the rear surface at the any one point is represented by $\theta$ (°); and that the height of a rise of one of the series of annular steps at the any one point in a direction of a normal extending from an annular surface of the one of the series of annular steps is represented by $\Delta$ (mm), for any one of light rays having a wavelength $\lambda$ (mm) within a range of $5\times10^{-4}$ through $6\times10^{-4}$; the following equation (5) is satisfied:

$$\Delta = |\lambda/(\cos\theta - n_{80}\cos\theta')| \quad (5)$$

wherein $n_{80}$ represents the refractive index of a lens material of the spectacle lens relative to the wavelength $\lambda$.

Furthermore, in the case where the diffractive structure is formed as the surface relief diffractive structure and where the diffractive structure is formed on the rear surface of the spectacle lens, it is preferable that the spectacle lens be a single-vision lens, wherein providing, at any one point on the rear surface within a radius h of at least 30 mm about the geometric center of the spectacle lens, that the angle of a normal extending from an annular surface of one of the series of annular steps on the rear surface at the any one point thereon relative to an optical axis of the spectacle lens is represented by $\gamma$ (°); and that the height of a rise of one of the series of annular steps a the any one point in a direction of the normal is represented by $\Delta$, for any one of light rays having a wavelength $\lambda$ (mm) within a range of $5\times10^{-4}$ through $6\times10^{-4}$ the following conditions (6) and (7) are satisfied:

$$|\lambda/[\cos\psi - n_\lambda\cos\{\sin^{-1}(\sin\psi/n_{80})\}]| - 1\times10^{-5}\times h < \Delta \quad (6)$$

$$\Delta < |\lambda/[\cos\psi - n_\lambda\cos\{\sin^{-1}(\sin\psi/n_{80})\}]| + 1\times10^{-5}\times h \quad (7)$$

wherein $\psi$ is expressed by the following equation (9):

$$\psi = \tan^{-1}(h/25) - \gamma \quad (9), \text{ and}$$

wherein $\psi$ represents the refractive index of a lens material of the spectacle lens relative to the wavelength $\lambda$. In the case where the spectacle lens is a negative lens, the series of annular steps are preferably formed such that each of rises of the series of annular steps extends to decrease the thickness of the spectacle lens in a radial direction from an innermost annular step toward an outermost annular step of the series of annular steps. In another case where the spectacle lens is a positive lens, the series of annular steps are preferably formed such that each of rises of the series of annular steps extends to increase the thickness of the spectacle lens in a radial direction from an innermost annular step toward an outermost annular step of the series of annular steps.

The present disclosure relates to subject matter contained in Japanese Patent Application No. 9-89765 (filed on Apr. 8, 1997) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 27A:
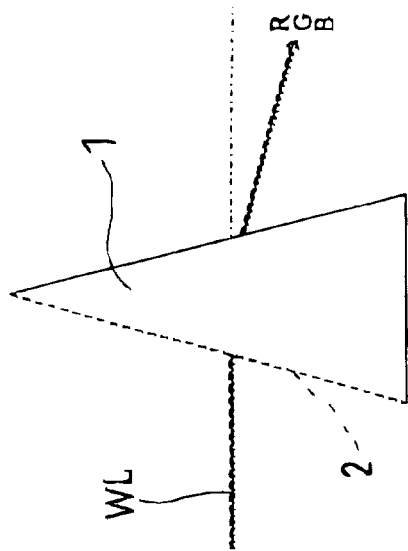
FIGS. 27(a), 27(b) and 27(c) are explanatory views showing a principle of compensating chromatic aberration with effect of a combination of refraction and diffraction.

The spectacle lens according to the present invention is based on a fundamental principle of compensating the transverse chromatic aberration caused by the macroscopic surface shape (macroscopic refraction) of the spectacle lens with the transverse chromatic aberration produced intentionally by a diffractive structure (e.g., diffraction grating) integrally formed on the spectacle lens. The principle of compensating chromatic aberration with effect of a combination of refraction and diffraction will be hereinafter discussed with reference to FIGS. 27(a), (b) and (c).

Figure 27B:
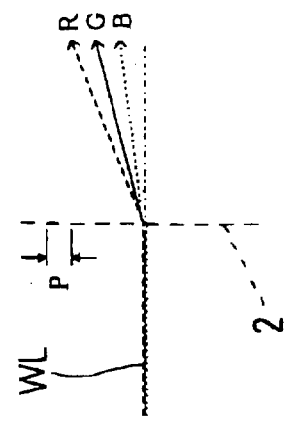
Figure 27C:
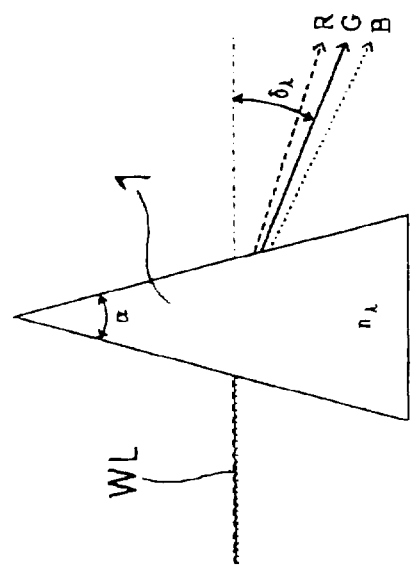

A lens can be regarded as being made of a series of prisms having a different angles at different points. For visible light, the larger the refractive index of a conventional material is, the shorter the wavelength of the light passing through the material becomes. Accordingly, the blue light component (B) of the white light WL incident on a prism 1 is bent by the same by a larger angle than the red light component (R) as can be seen from FIG. 27(a). On the other hand, the red light component (R) of the white light WL incident on a diffraction grating 2 is bent by the same by a larger angle than the blue light component (B) as can be seen from FIG. 27(b). Therefore, with the use of a combination of the wavelength characteristic of the prism 1 and the wavelength characteristic of the diffraction grating 2, all the light components (R), (G) and (B) of the white light WL can be bent by substantially the same angle, as can be seen from FIG. 27(c).

The aforementioned principle will be hereinafter discussed quantitatively.

Provided that the angle of deviation of a light ray having a wavelength λ (mm) through the prism 1 is $\delta_\lambda$ (radians), the apex angle of the prism 1 is a α (radians) and the refractive index of the prism 1 relative to a light ray having a wavelength λ (mm) is $n_\lambda$, the following equation is given:

$$\delta_{80} \approx (n_{80}-1)\alpha.$$

Provided that the angle of deviation of a light ray having a wavelength λ (mm) through the prism 1 is $\delta_\lambda$ (radian), the prism power P (prism diopter) is determined by the following equation:

$$P = 100 \times \tan\delta_\lambda \approx 100 \times \delta_\lambda.$$

Provided that the refractive index of the prism 1 relative to a light ray having a wavelength of 588 nm (d-line), a light ray having a wavelength of 656 nm (c-line) are $n_d$, $n_f$ and $n_c$, respectively, and that the equation regarding Abbe number ($\upsilon = (n_d-1)/(n_f-n_c)$) and the aforementioned equation (P=100× $\tan\delta_{80} \approx 100 \times \delta_\lambda$) are used, the difference Δδ (radians) between the angle of deviation ($\delta_f$) of the light ray having a wavelength of 486 nm (f-line) and the angle of deviation ($\delta_c$)

of the light ray having a wavelength of 656 nm (c-line) is determined as follows:

$$\Delta\delta = \delta_f - \delta_c$$
$$\doteq (n_f - 1)\alpha - (n_c - 1)\alpha$$
$$= (n_f - n_c)\alpha$$
$$\doteq (n_f - n_c)\delta_d / (n_d - 1)$$
$$= \delta_d / \nu$$
$$\doteq P / (100\nu).$$

On the other hand, the diffraction angle $\phi\lambda$ (radians) of a light ray having a wavelength $\lambda$ (mm) through the diffraction grating 2 is determined by the following equation:

$$\phi\lambda \approx m\lambda/p$$

wherein p represents the pitch of the diffraction grating 2 (mm), and m represents the order of diffraction of the diffraction grating 2.

Therefore, the difference $\Delta\phi$ (radians) between the angle of diffraction ($\phi_f$) of the light ray having a wavelength of 486 nm (f-line) and the angle of deviation ($\phi_c$) of the light ray having a wavelength of 656 nm (c-line) is determined as follows:

$$\Delta\phi = \phi_f - \phi_c$$
$$\doteq (\lambda_f - \lambda_c)/p$$
$$= (486 - 656) \times 10^{-6} / p$$
$$= -170 \times 10^{-6} / p$$

wherein the first-order diffracted light rays of the f-line and c-line are used, and wherein $\lambda_f$ and $\lambda_c$ are the wavelengths of the f-line and c-line, respectively.

In order to eliminate both the chromatic aberration due to refraction and the chromatic aberration due to diffraction, $\Delta\phi$ should be equal to $-\Delta\phi$, so that the following equation is obtained:

$$p \approx 0.017\nu/P.$$

In a single-vision spectacle lens, among the prism power P (prism diopter), the vertex power D (diopter) and the distance h (mm) from the optical axis along a specified cross section, the following equation known as Prentice's rule is fulfilled:

$$p \approx D \times h / 10.$$

Hence, the aforementioned equation ($p \approx 0.017\nu/P$) can be rewritten to be the following equation:

$$p \approx 0.17\nu/(D \times h).$$

Since the light-ray deviation angle, the value of order of diffraction, the value of prism power and the like each bear either the positive sign (+) or the negative sign (−), the aforementioned equation ($p \approx 0.017\nu/P$) can be modified to:

$$p \approx 0.17\nu/|p| \text{ or } P \approx 0.17\nu/|D \times h|.$$

Such equations represent the conditions for correcting transverse chromatic aberration of the f-line and c-line. However, in practice an appropriate pitch p at each of optionally selected points (h) is determined through ray-tracing simulation.

In a spectacle lens that produces a large amount of chromatic aberration, in order to reduce transverse chromatic aberration, even if the difference $\Delta\delta$ (radians) between the angle of deviation ($\delta_f$) of f-line and the angle of deviation ($\delta_c$) of c-line cannot be totally removed, a satisfactory improvement can be attained if the transverse chromatic aberration is reduced approximately by half. In this case, instead of the aforementioned equation, ($p \approx 0.017\nu/|P|$ or $p \approx 0.17\nu/|D \times h|$) the following equation is used:

$$p \approx 0.034\nu/|P| \text{ or } p \approx 0.34\nu/|D \times h|.$$

In practice, a satisfactory effect in the correction of chromatic aberration can be attained if the following condition is satisfied:

$$p < 0.04\nu/|P| \text{ or } p < 0.4\nu/|D \times h|.$$

In the case where a diffractive structure having an excessively small pitch is formed on a spectacle lens, the amount of scattering light becomes excessively large, so that the light loss cannot be neglected. From this perspective, it is preferable that the minimum pitch p(mm) should be approximately 5 μm. Namely, the condition "p>0.005" is preferably satisfied.

Transverse chromatic aberration can be effectively corrected by such diffractive structure in the case where a spectacle lens is made of an optical plastic material whose Abbe number υ is less than 45 (υ<45).

Figure 28C:
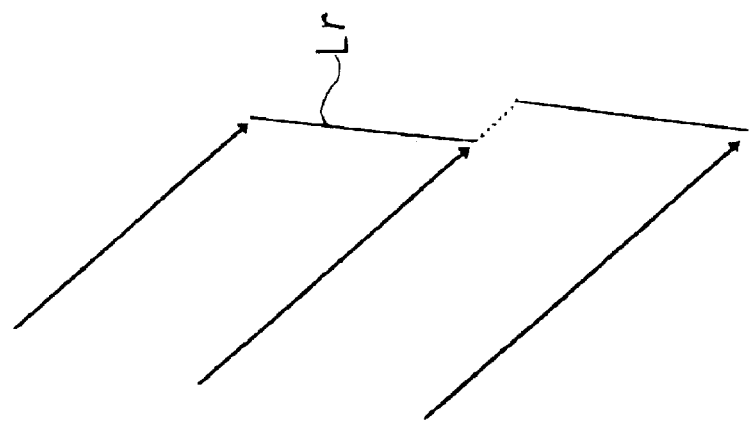
FIGS. 28(a), 28(b) and 28(c) are explanatory views showing a comparison between a first case where a diffractive structure is formed on a front surface Lf of a spectacle lens L and a second case where diffractive structure is formed on a rear surface Lr of the spectacle lens L.
Figure 28B:
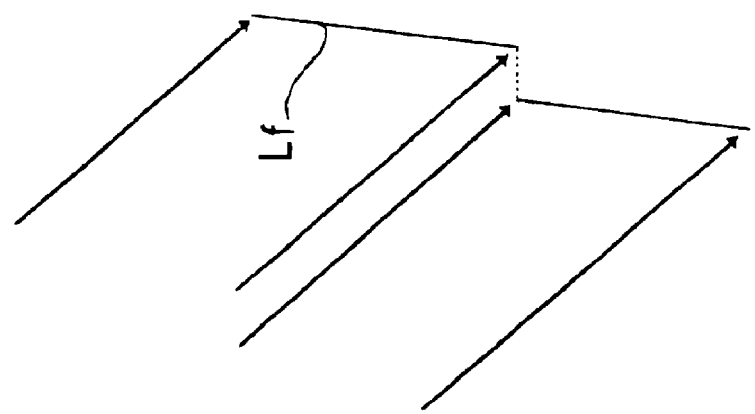
Figure 28A:
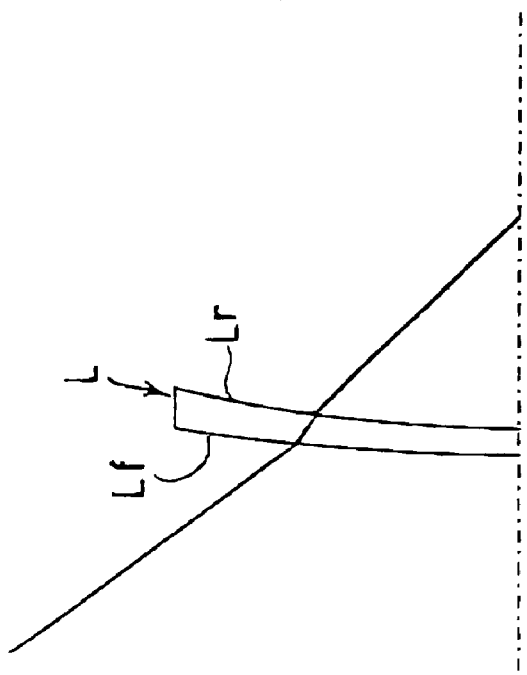

A diffractive structure can be formed on either the front or rear of a spectacle lens. However, in the case where the spectacle lens is a negative lens made of a synthetic resin or plastic and the diffractive structure is provided as a surface relief diffractive structure, it is preferable that the diffractive structure be formed on the rear surface of the lens. FIGS. 28(a), 28(b) and 28(c) are explanatory views showing a comparison between a first case shown in FIG. 28(b) where a surface relief diffractive structure is formed on a front surface Lf of a spectacle lens L having a negative refractive power and a second case shown in FIG. 28(c) where a surface relief diffractive structure is formed on a rear surface Lr of the spectacle lens L having a negative refractive power. In the former case where a surface relief diffractive structure is formed on the front surface Lf, light rays which pass through a riser part or rise (indicated by a broken line in FIG. 28(b)) between two adjacent steps of the surface relief diffractive structure become scattering light, which is undesirable. In this case it is possible to reduce the scattering light by making the surface of the riser part parallel to the incident light rays. However, forming the lens L in such a manner using a mold causes undercuts, which makes the removal thereof impossible.

In the latter case where a surface relief diffractive structure is formed on the rear surface Lr, even if a riser part (indicated by a broken line in FIG. 28(c)) between two adjacent steps of the surface relief diffractive structure is formed parallel to the incident light rays in such a manner as shown in FIG. 28(c), the lens can be taken out of the mold. Furthermore, the scattering light can be reduced more than the former case.

Figure 29:
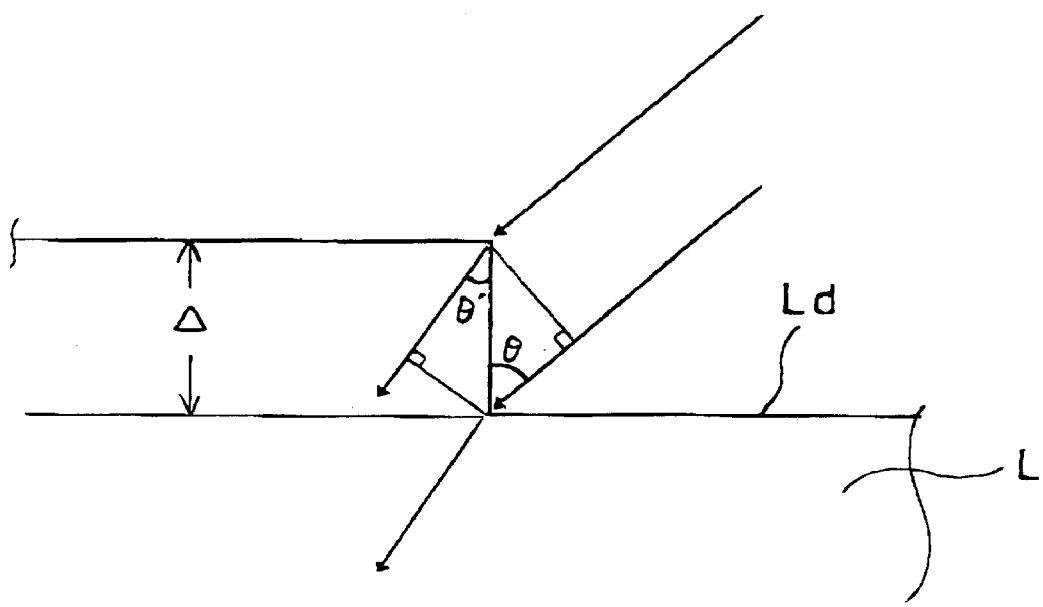
FIG. 29 is an explanatory view for explaining a preferable height of a stepped portion of the diffractive structure formed on the spectacle lens shown in FIG. 28 (a)

FIG. 29 is an explanatory view for explaining a preferable height of the rise of a stepped portion of the surface relief diffractive structure formed on the spectacle lens L. In FIG. 29, Ld represents a surface of the spectacle lens L on which the surface relief diffractive structure is formed. θ represents the incident angle (°) of an external light ray (with respect to lens L) incident on the surface Ld (or the exit angle (°) of a light ray emergent from the surface Ld) while θ' represents the angle (°) of refraction of a light ray refracted through the surface Ld (or the angle (°) of an internal light ray (with respect to the lens L) incident on the surface Ld). Further, $\Delta$ represents the height or length (mm) of the rise of a stepped portion of the surface relief diffractive structure at an incident point of the light ray on the surface Ld. In the following description, $\lambda$ represents the reference wavelength (mm) used for designing the spectacle L, and $n_\lambda$ represents the refractive index of a lens material of the spectacle lens L relative to the reference wavelength $\lambda$.

Light rays which are incident on the lens L pass therethrough in a direction which renders the difference (optical path difference) between the optical path length of a light ray having passed through the inside of the stepped portion and the optical path length of another light ray having passed through the outside of the stepped portion to be a multiple of the value of $\lambda$. In the case of assuming that the optical path difference of one time of $\lambda$ occurs due to the stepped portion, the following equation is satisfied:

$$\Delta = |\lambda/(\cos\theta - n_\lambda \cos\theta')|.$$

According to Snell's law, "$\cos\theta'$" can be replaced by "$\cos(\sin^{-1}(\sin\theta/n_\lambda))$", so that the equation can be rewritten in the following equation:

$$\Delta = |\lambda/[\cos\theta - n_\lambda \cos(\sin^{-1}(\sin\theta/n_\lambda))]|.$$

Figure 30:
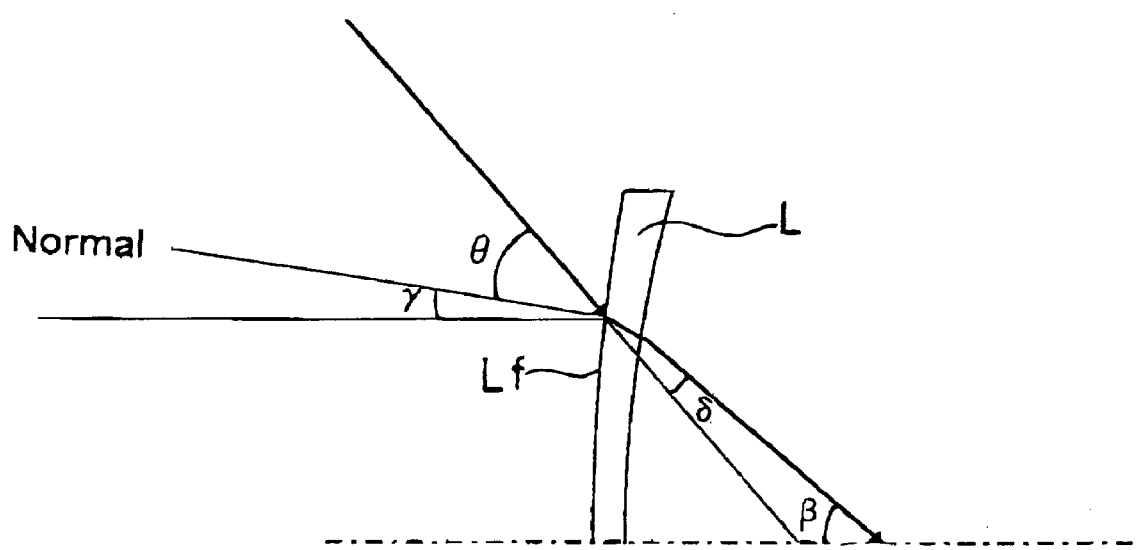
FIG. 30 is a cross sectional view of a spectacle lens provided on a front surface thereof with a diffractive structure.

The aforementioned height $\Delta$ is that obtained in an ideal condition where the diffraction efficiency of the surface relief diffractive structure if 100 percent. However, an approximate value of the incident angle $\theta$ can be deduced using the power of the lens and the shape of the surface on which the surface relief diffractive structure is formed. Namely, at any one point on the lens surface having the surface relief diffractive structure thereon within a radius of at least 30 mm (radius h<30 mm) about the geometric center of the lens (i.e., about the optical axis), providing that the vertex power along a specified cross section of the lens that includes the aforementioned point and the optical axis is represented by D (diopter), and that the angle of a normal extending from an annular surface of the stepped portion at the aforementioned point thereon relative to the optical axis of the spectacle lens L is represented by $\gamma$ (°), the following equation is satisfied in the case where the surface relief diffractive structure is formed on the front surface Lf of the lens L:

$$\theta + \gamma = \beta - \delta \text{ (see FIG. 30).}$$

Therefore, the following equation is obtained:

$$\Gamma = \beta + \delta - \gamma.$$

Using approximate value of $\beta$ and $\delta$, an approximate incident angle $\psi$ can be given by the following equation:
$\psi = \tan^{-1}(h/25) - 180 \, Dh/1000\pi - \gamma$.

Figure 31:
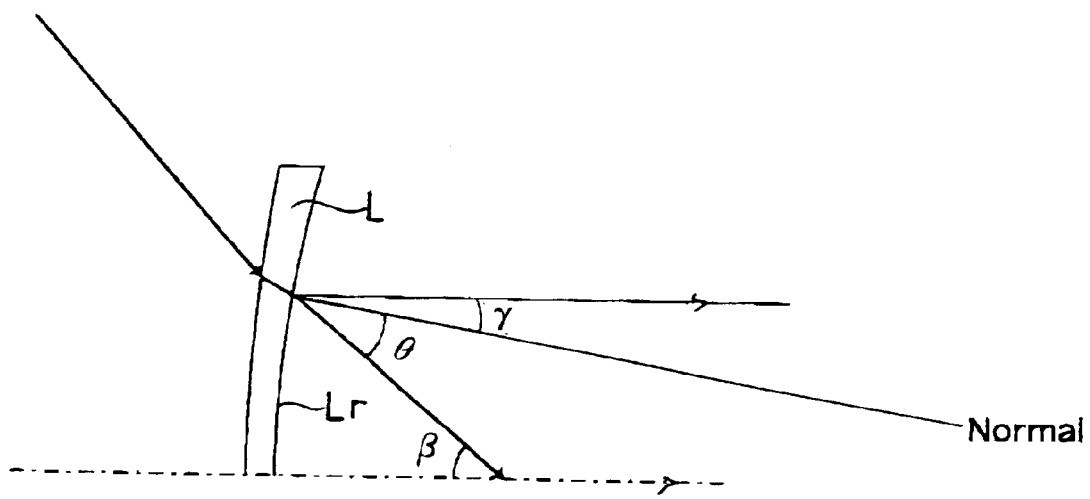
FIG. 31 is a cross sectional view of a spectacle lens provided on a rear surface thereof with a diffractive structure.
Figure 32:
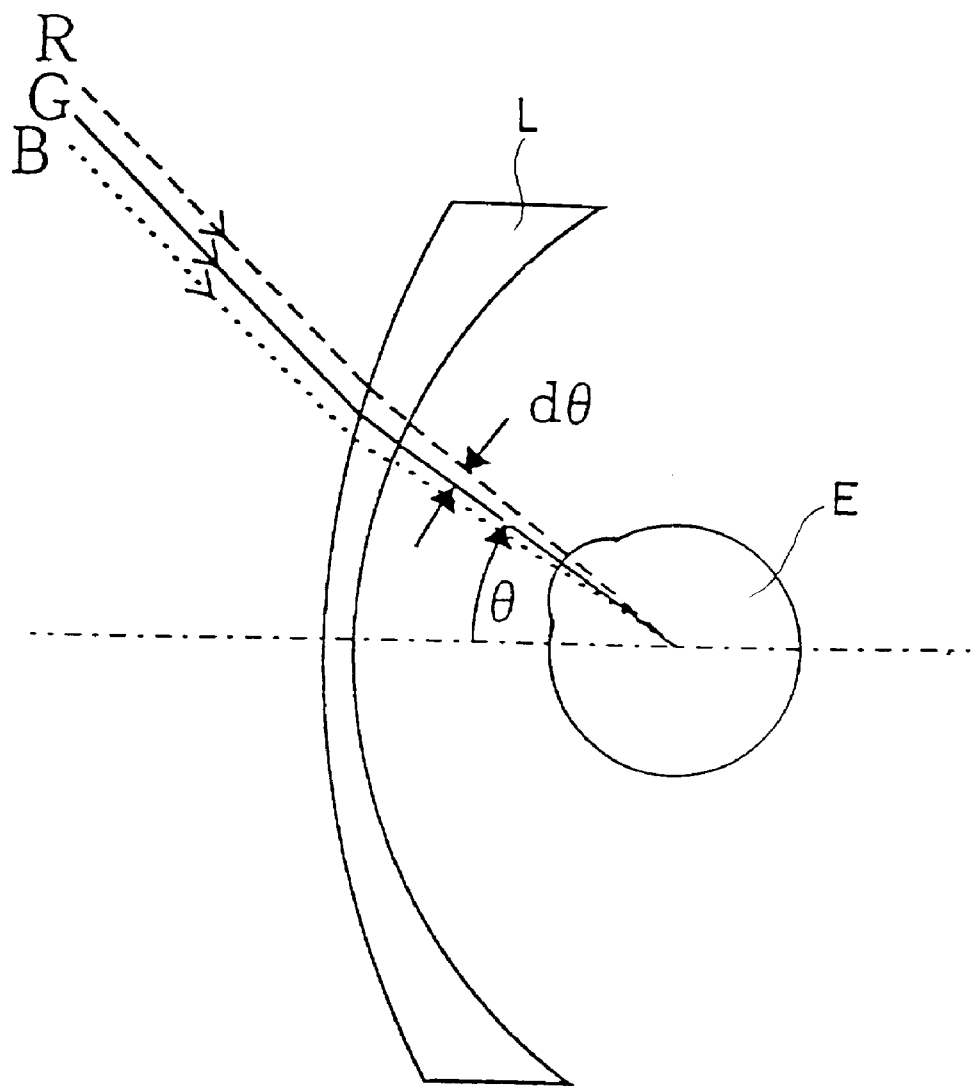
FIG. 32 is an explanatory view that shows the variation of refraction of light rays having different wavelengths through a conventional spectacle lens.

On the other hand, in the case where the surface relief diffractive structure is formed on the rear surface Lr of the lens L, the following equation is given:

$$\psi = \tan^{-1}(h/25) - \gamma \text{ (see FIG. 31).}$$

The height $\Delta$ of the rise of the stepped portion of the surface relief diffractive structure at the aforementioned incident point in the direction of a normal extending from an annular surface of the stepped portion is preferably determined using the aforementioned approximate incident angle $\psi$ so as to satisfy the following conditions:

$$|\lambda/[\cos\psi - n_\lambda \cos(\sin^{-1}(\sin\psi/n_\lambda))]| - 1\times 10^{-5} \times h < \Delta$$

$$\Delta < |\lambda/[\cos\psi - n_\lambda \cos(\sin^{-1}(\sin\psi/n_\lambda))]| + 1\times 10^{-5} \times h.$$

If the height $\Delta$ of the rise of the stepped portion is determined by satisfying these conditions, a practical sufficient diffraction efficiency can be obtained. If the height of the rise of the stepped portion $\Delta$ is determined without satisfying these conditions, the diffraction efficiency will be low, which deteriorates the view through the spectacle lens L.

The first through sixth embodiments of spectacle lenses to which the present invention is applied will be hereinafter discussed with reference to FIGS. 1 through 26. In each embodiment, the geometric center of the spectacle lens is coincident with the optical axis thereof. In FIGS. 4, 9, 13, 17, 21 and 25, the horizontal axis (abscissa) represents the numerical value N which is the reciprocal of the pitch p of concentric rings.

First of all, the first through fourth embodiments according to the first aspect of the present invention will be hereinafter discussed. Each of the first through fourth embodiments is a spectacle lens provided thereon with a diffractive structure having a stepped cross section, i.e., a surface relief diffractive structure. Namely, each of the first through fourth embodiments is a spectacle lens on which a micro fresnel lens is integrally formed.

First Embodiment

The first embodiment of a spectacle lens 10 is made of a lens material having a refractive index of 1.66 and Abbe number of 32. This spectacle lens 10 is provided on a front surface 11 thereof with a surface relief diffractive structure consisting of concentrically-arranged minute circular stepped portions (a series of concentric rings or annular steps) to correct chromatic aberration. The vertex power of the lens 10 is −8.00 (diopter). The optical center thickness tc and the rim thickness te of the lens 10 are 1.1 (mm) and 9.123 (mm), respectively.

Figure 1:
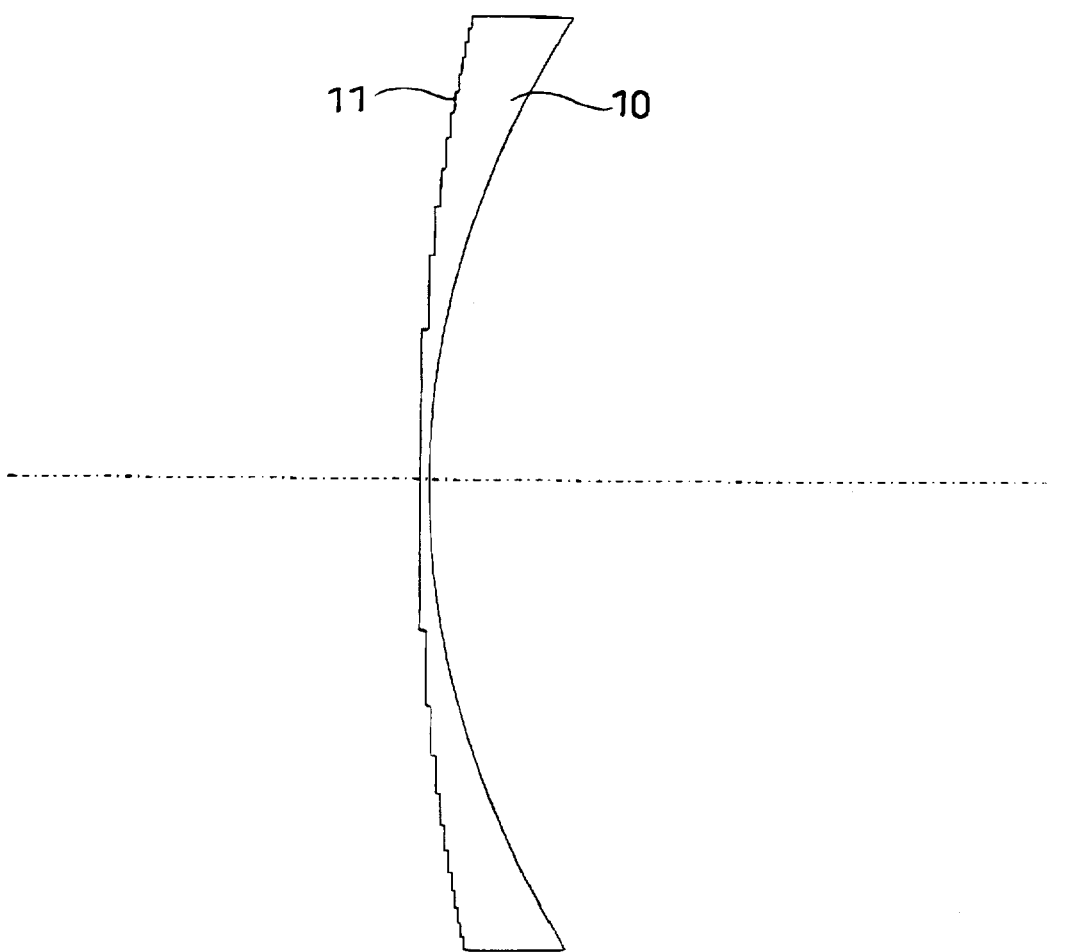
FIG. 1 is a cross sectional view of a first embodiment of a spectacle lens according to a first aspect of the present invention, wherein a diffractive structure formed on the front surface of the spectacle lens is exaggeratively shown.
Figure 2:
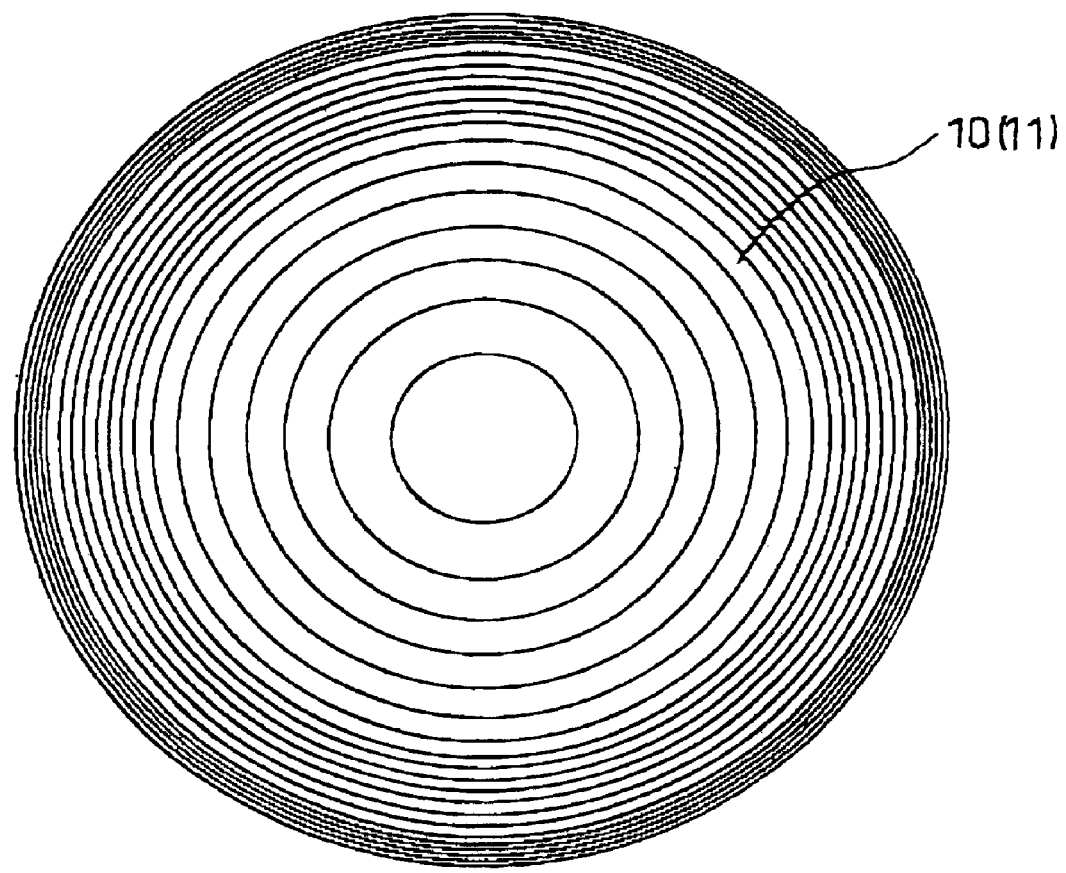
FIG. 2 is a front view of the spectacle lens shown in FIG. 1, wherein the diffractive structure formed on the front surface of the spectacle lens is exaggeratively shown.
Figure 3:
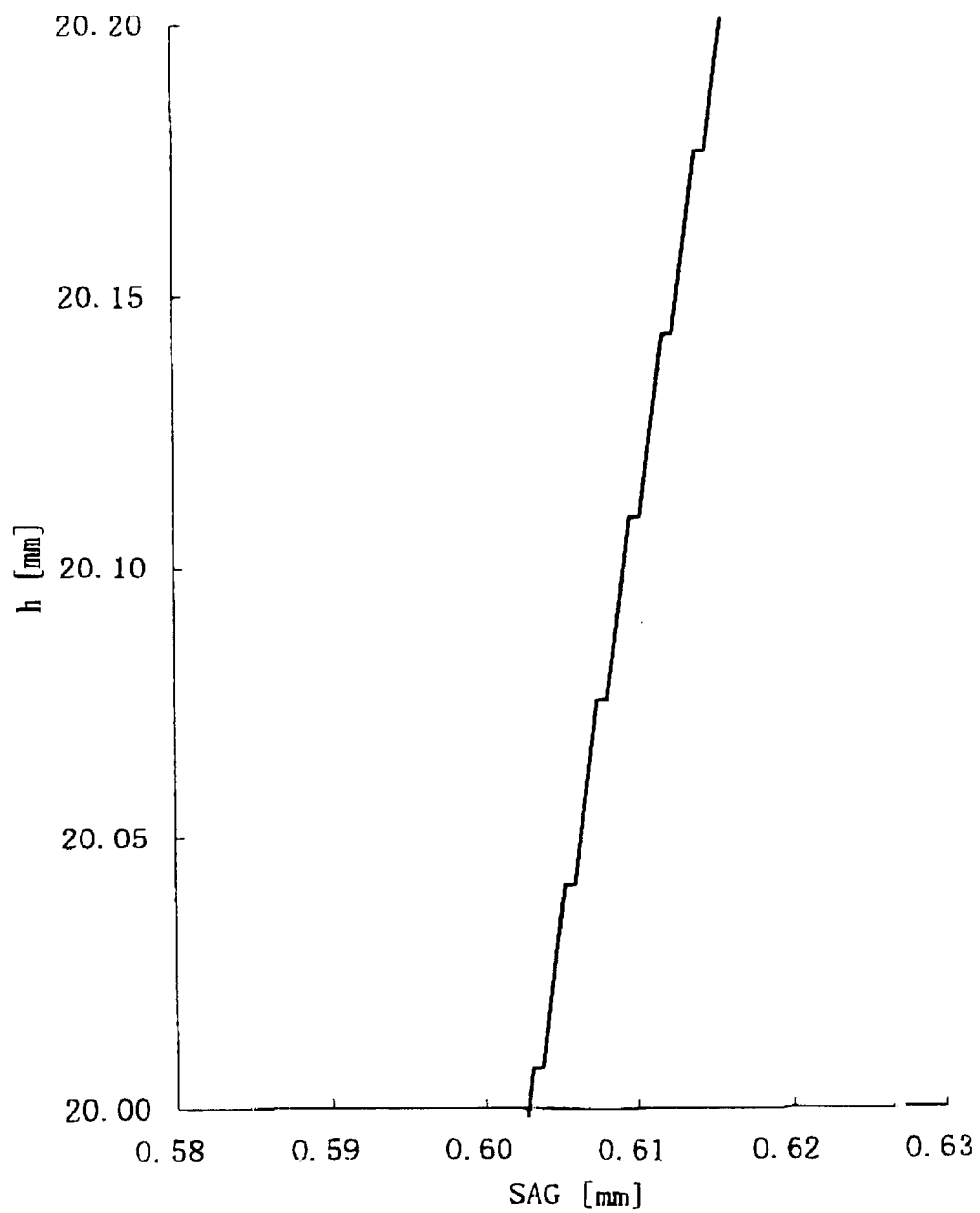
FIG. 3 is an enlarged cross sectional view of a part of the front surface of the spectacle lens shown in FIG. 1.
Figure 4:
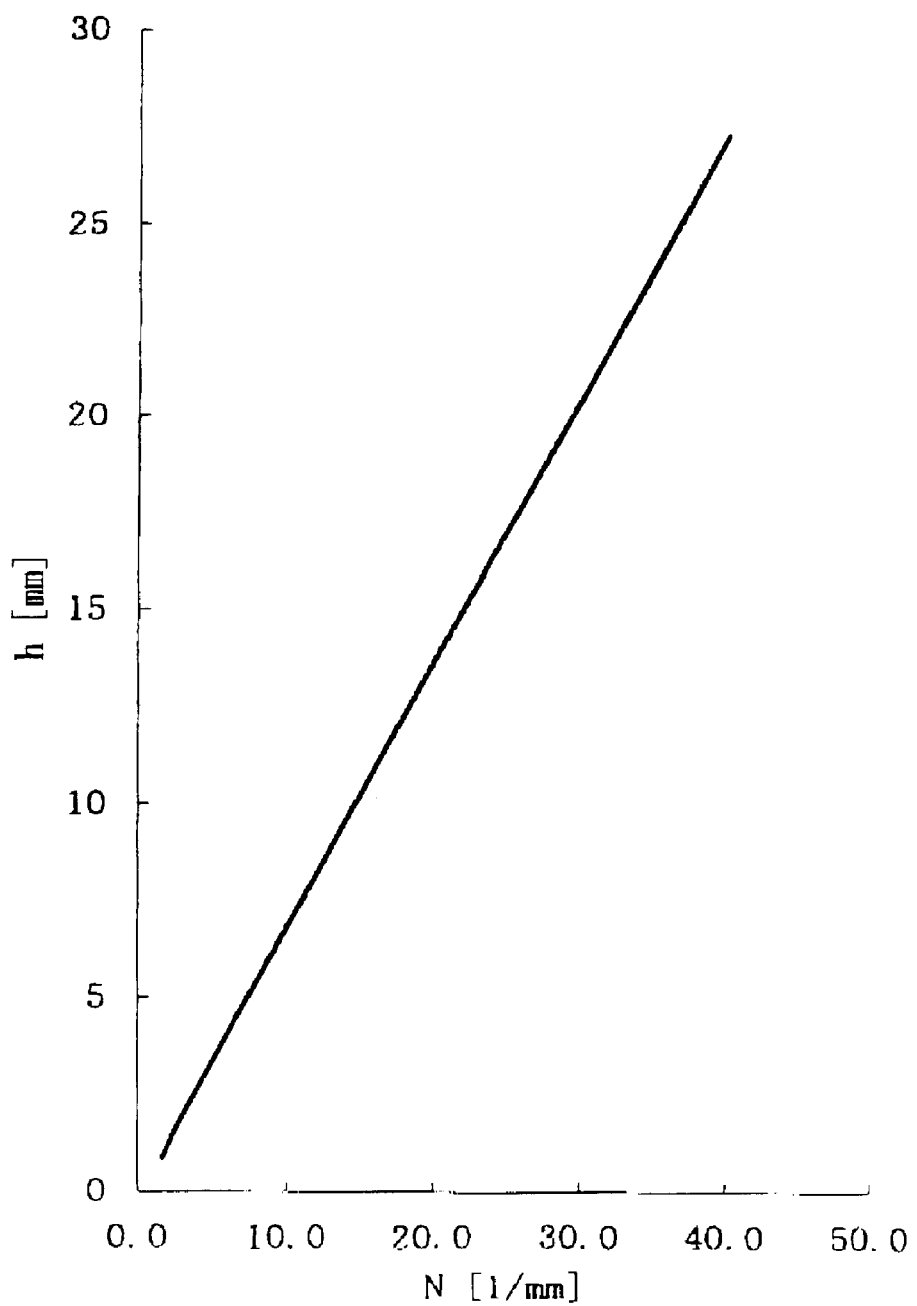
FIG. 4 is a graph showing the distribution of pitch of steps which form the diffractive structure of the lens shown in FIGS. 1 and 2.
Figure 5:
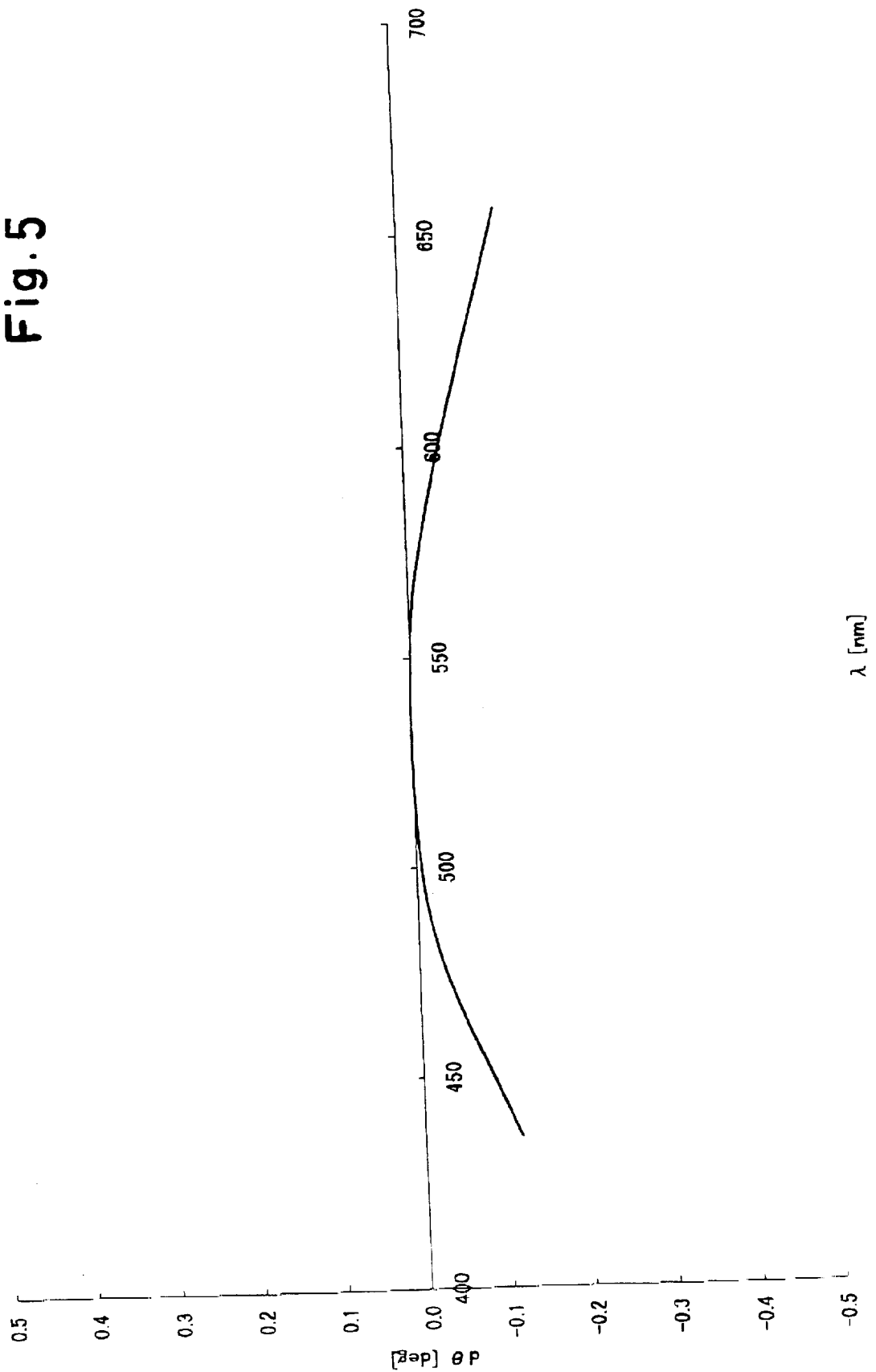
FIG. 5 is a graph showing the chromatic aberration caused by the first embodiment of the spectacle lens shown in FIGS. 1 and 2.

FIGS. 1 and 2 show a cross sectional view and a front view of the first embodiment of the spectacle lens 10, respectively. In each of FIGS. 1 and 2, the dimensions of the stepped portions drawn on the front surface 11 are greatly enlarged (exaggerated) from their actual size so that the stepped portions can be clearly seen in each Figure. Therefore, the actual stepped portions formed on the front surface 11 are too minute to be seen by the naked eye. FIG. 3 is an enlarged cross sectional view of part of the front surface 11 which is located about a position approximately 20 mm away from the optical axis of the lens 10. The pitch of the stepped portions of the diffractive structure varies depending on the locating (distance h from the optical axis) on the front surface 11, as can be seen from FIG. 4. FIG. 5 shows the transverse chromatic aberration in the case of viewing through the first embodiment of the specific spectacle 10 in a direction with a visual angle of 50 degrees. Upon comparing this first embodiment of the spectacle lens 10 with the second prior art (the aforementioned conventional spectacle lens) whose chromatic aberration is shown by solid line in FIG. 33 and which is made of a material identical to the material of the first embodiment of the spectacle lens 10, it can be appreciated that the chromatic aberration caused by this first embodiment of the spectacle lens 10 is greatly reduced.

Second Embodiment

The second embodiment of a spectacle lens 10 is made of a lens material having a refractive index of 1.66 and Abbe number of 32. This spectacle lens 10 is provided on a rear surface 12 thereof with a surface relief diffractive structure consisting of concentrically-arranged minute circular stepped portions (a series of concentric rings or annular steps) to correct chromatic aberration. The vertex power of the lens 10 is −8.00 (diopter). The optical center thickness tc and the rim thickness te of the lens 10 are 1.1 (mm) and 8.659 (mm), respectively.

Figure 6:
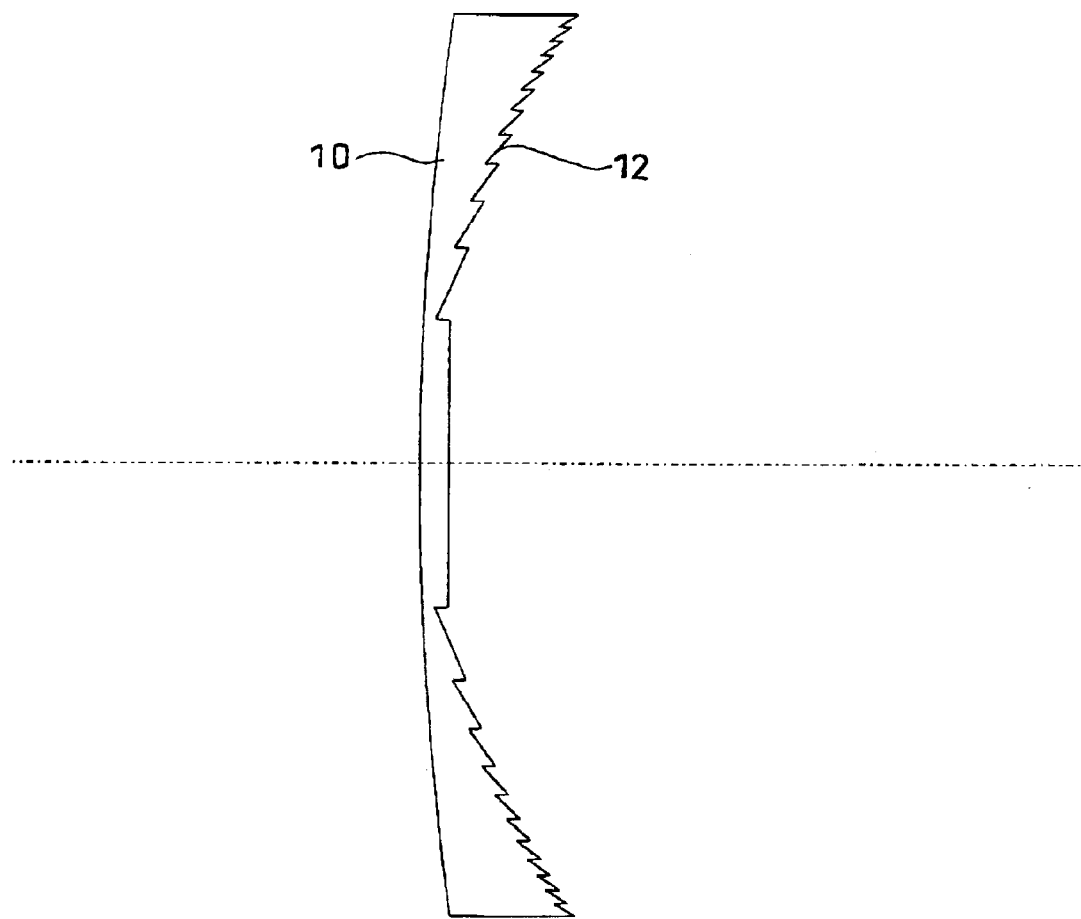
FIG. 6 is a cross sectional view of a second embodiment of a spectacle lens according to a first aspect of the present invention, wherein a diffractive structure formed on the rear surface of the spectacle lens is exaggeratively shown.
Figure 7:
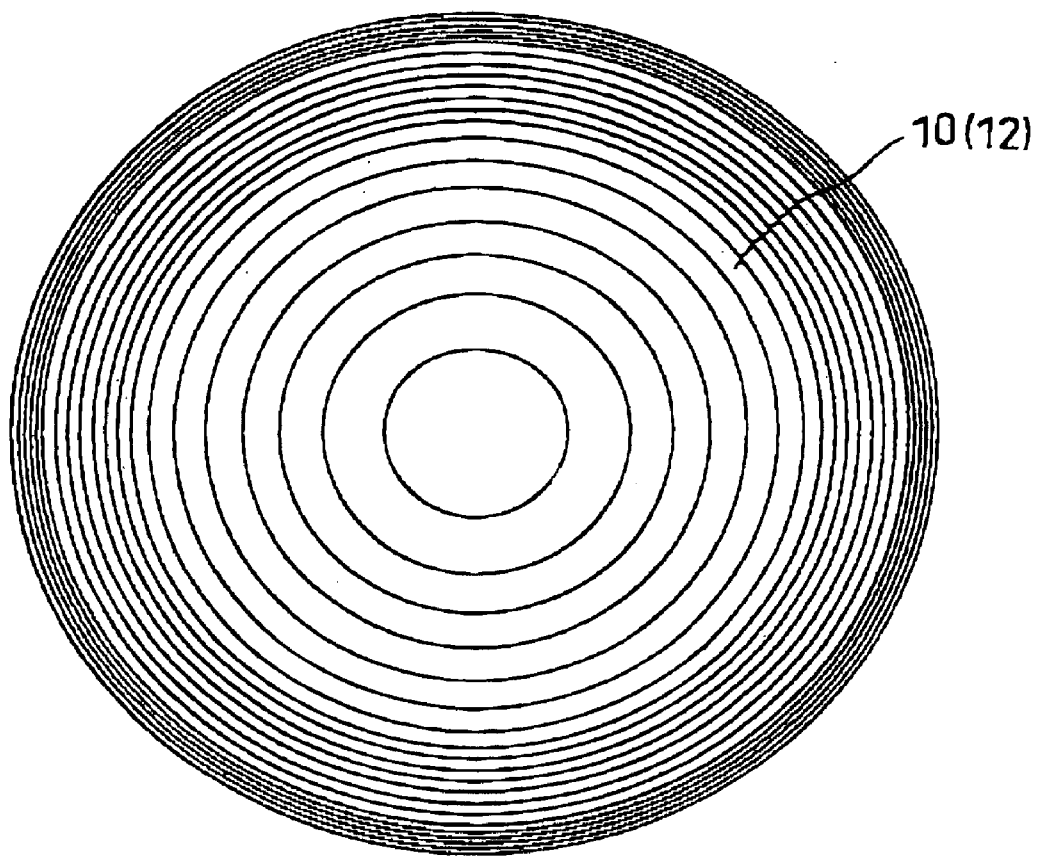
FIG. 7 is a rear view of the spectacle lens shown in FIG. 6, wherein the diffractive structure formed on the rear surface of the spectacle lens is exaggeratively shown.
Figure 8:
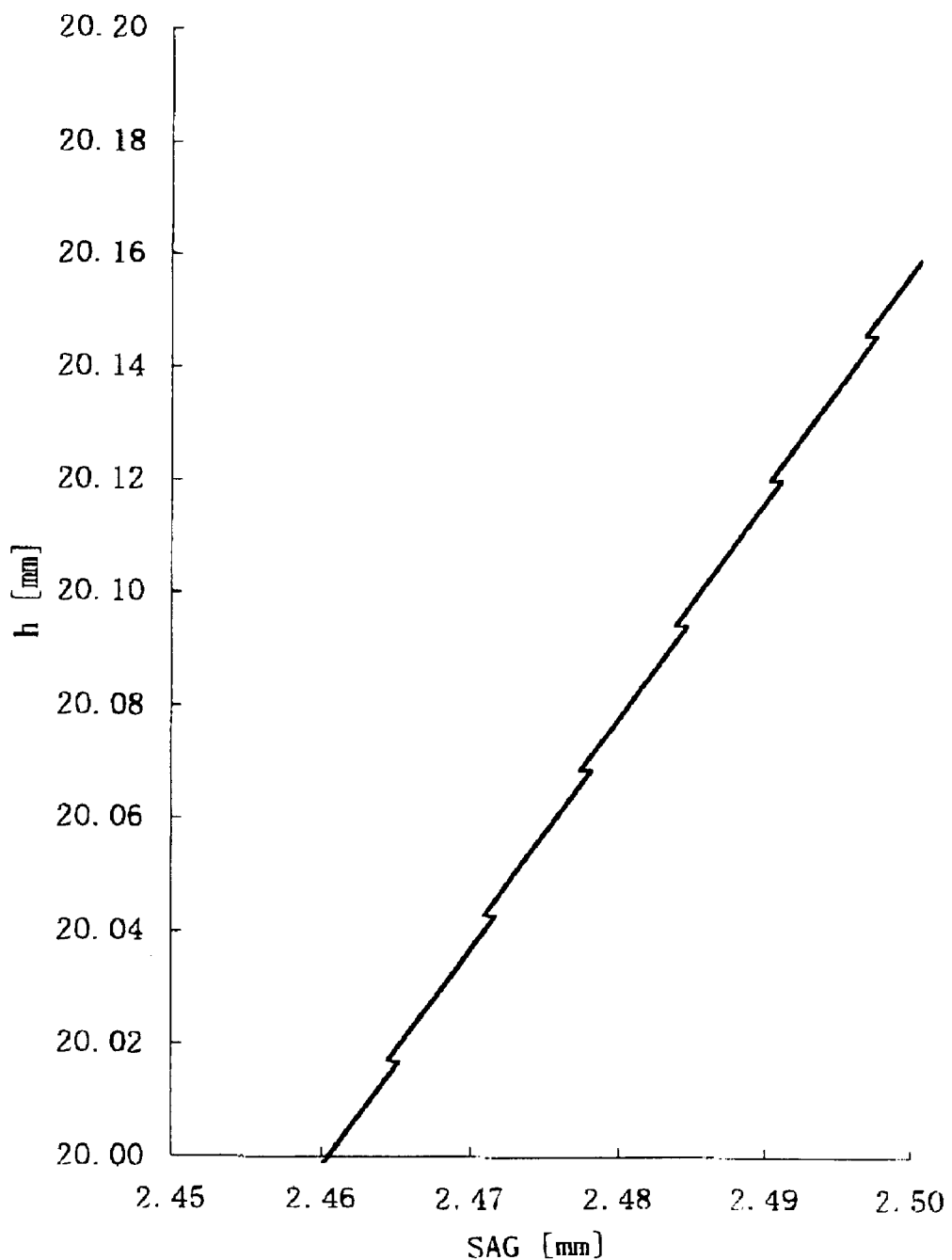
FIG. 8 is an enlarged cross sectional view of a part of the rear surface of the spectacle lens shown in FIG. 6.
Figure 9:
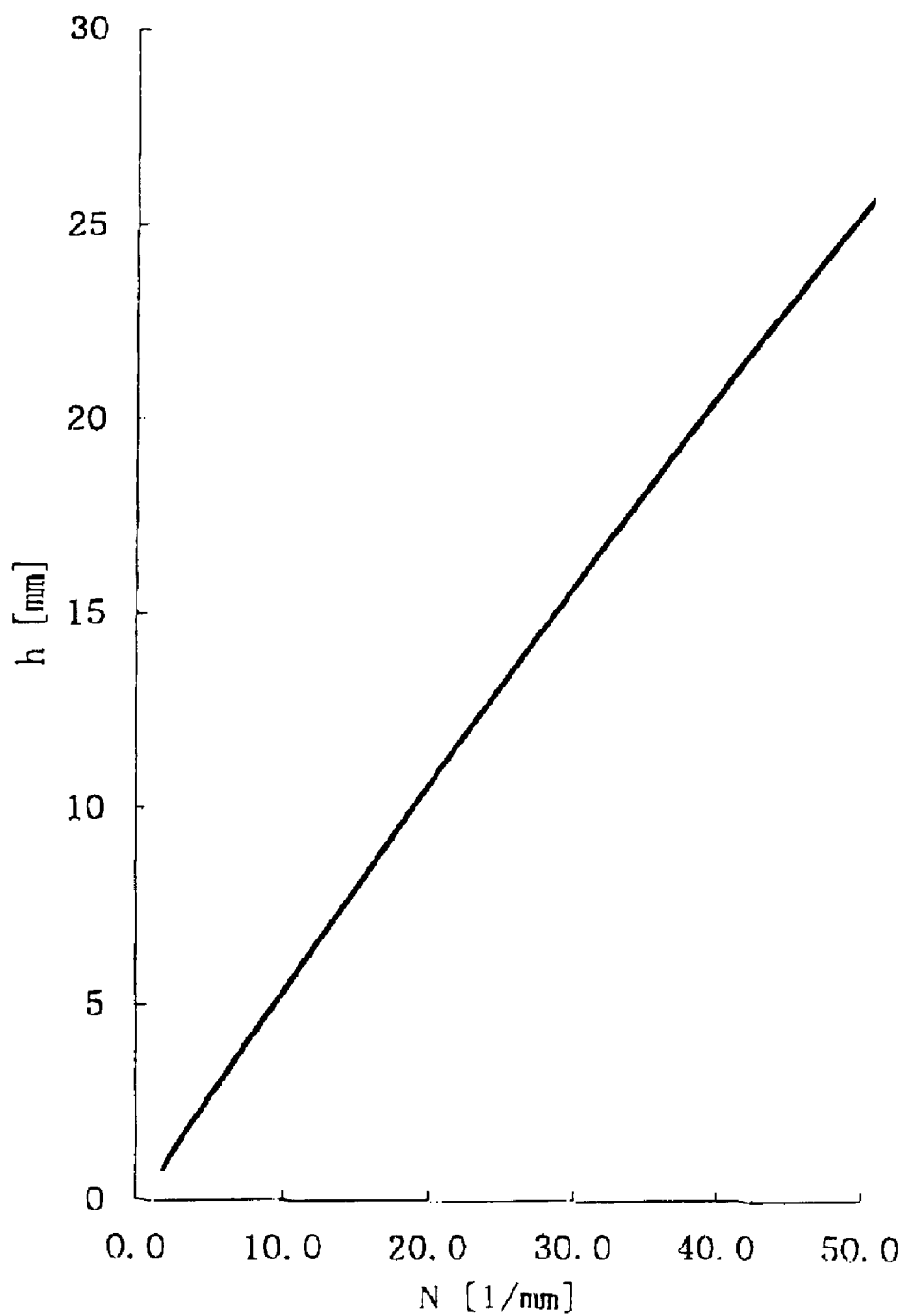
FIG. 9 is a graph showing the distribution of pitch of steps which form the diffractive structure of the lens shown in FIGS. 6 and 7.
Figure 10:
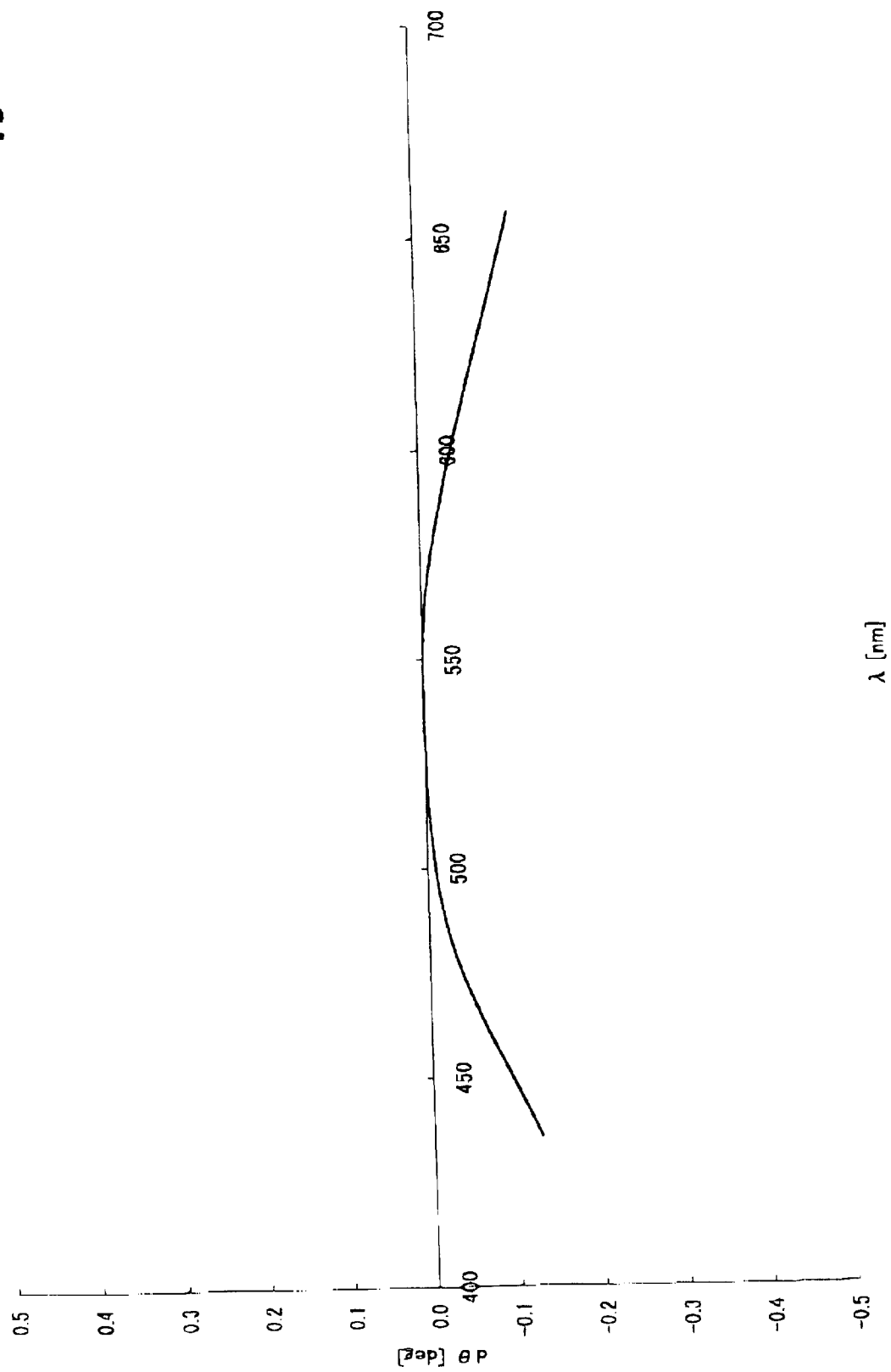
FIG. 10 is a graph showing the chromatic aberration caused by the second embodiment of the spectacle lens shown in FIGS. 6 and 7.

FIGS. 6 and 7 show a cross sectional view and a front view of the second embodiment of the spectacle lens 10, respectively. In each of FIGS. 6 and 7, the dimensions of the stepped portions drawn on the front surface 11 are greatly enlarged (exaggerated) from their actual size so that the stepped portions can be clearly seen in each Figure. Therefore, the actual stepped portions formed on the front surface 11 are too minute to be seen by the naked eye. FIG. 8 is an enlarged cross sectional view of part of the rear surface 12 which is located about a position approximately 20 mm away from the optical axis of the lens 10. The pitch of the stepped portions of the diffractive structure varies depending on the location (distance h from the optical axis) on the rear surface 12, as can be seen from FIG. 9. FIG. 10 shows the transverse chromatic aberration in the case of viewing through the second embodiment of the specific spectacle 10 in a direction with a visual angle of 50 degrees. Upon comparing this second embodiment of the spectacle lens 10 with the second prior art (the aforementioned conventional spectacle lens) whose chromatic aberration is shown by solid line in FIG. 33 and which is made of a material identical to the material of the second embodiment of the spectacle lens 10, it can be appreciated that the chromatic aberration caused by this second embodiment of the spectacle lens 10 is greatly reduced. Furthermore, the rim thickness of the second embodiment of the spectacle lens 10 can be successfully made small.

Third Embodiment

The third embodiment of a spectacle lens 10 is made of a lens material having a refractive index of 1.66 and Abbe number of 32. This spectacle lens 10 is provided on a front surface 11 thereof with a surface relief diffractive structure consisting of concentrically-arranged minute circular stepped portions is series of concentric rings or annular steps) to correct chromatic aberration. The vertex power of the lens 10 is +4.00 (diopter). The optical center thickness tc and the rim thickness te of the lens 10 are 4.29 (mm) and 1.229 (mm), respectively.

Figure 11:
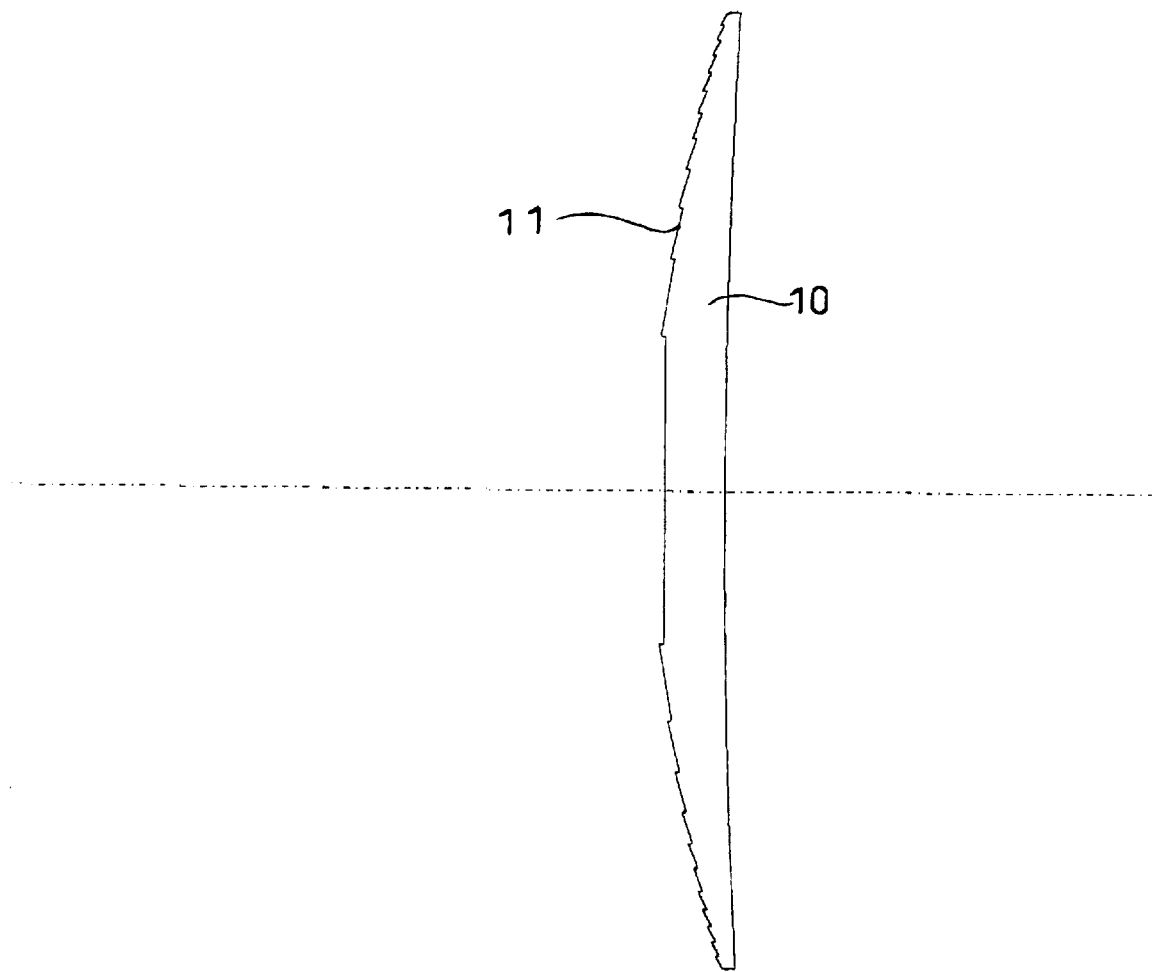
FIG. 11 is a cross sectional view of a third embodiment of a spectacle lens according to a first aspect of the present invention, wherein a diffractive structure formed on the front surface of the spectacle lens is exaggeratively shown.
Figure 12:
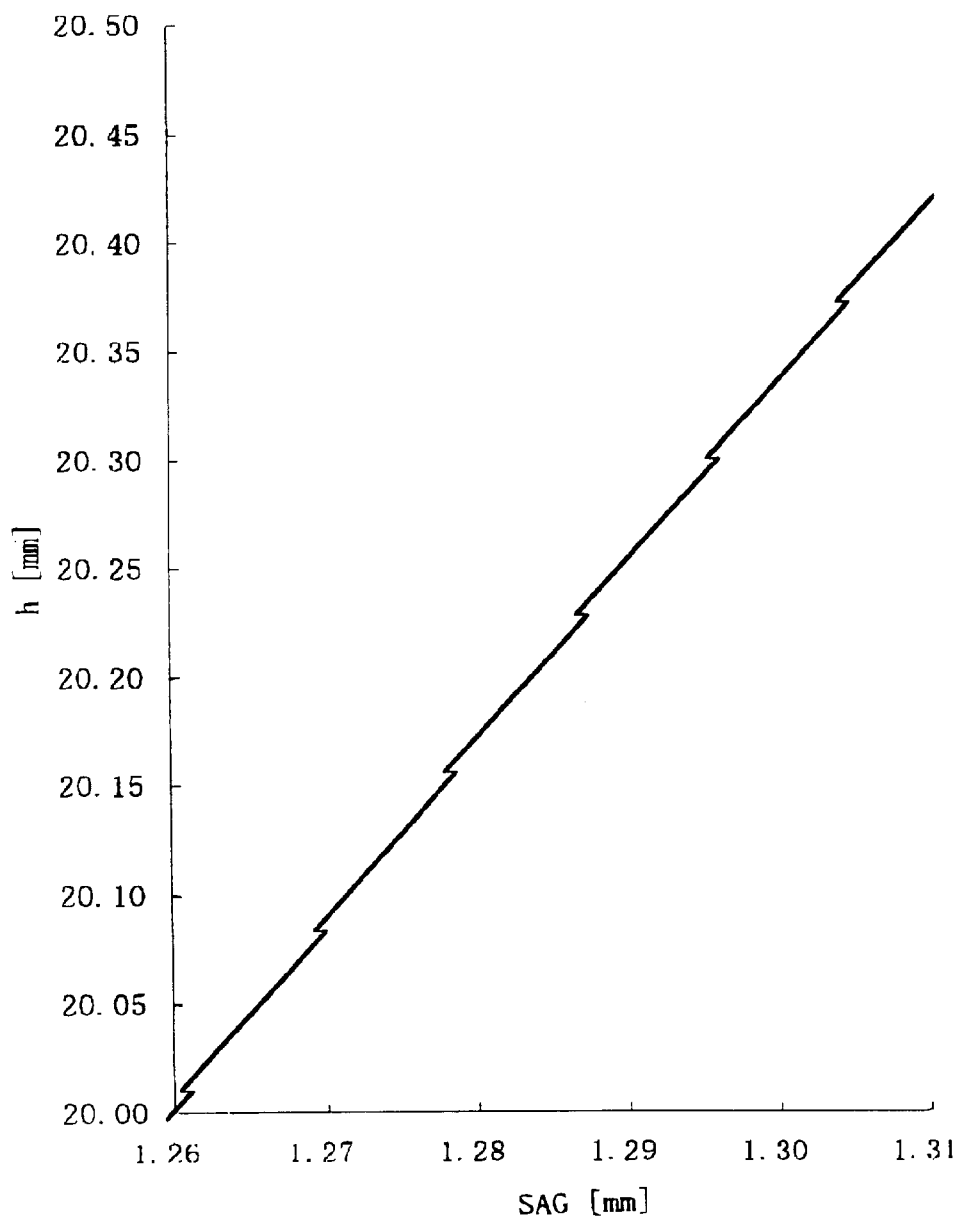
FIG. 12 is an enlarged cross sectional view of a part of the front surface of the spectacle lens shown in FIG. 11.
Figure 13:
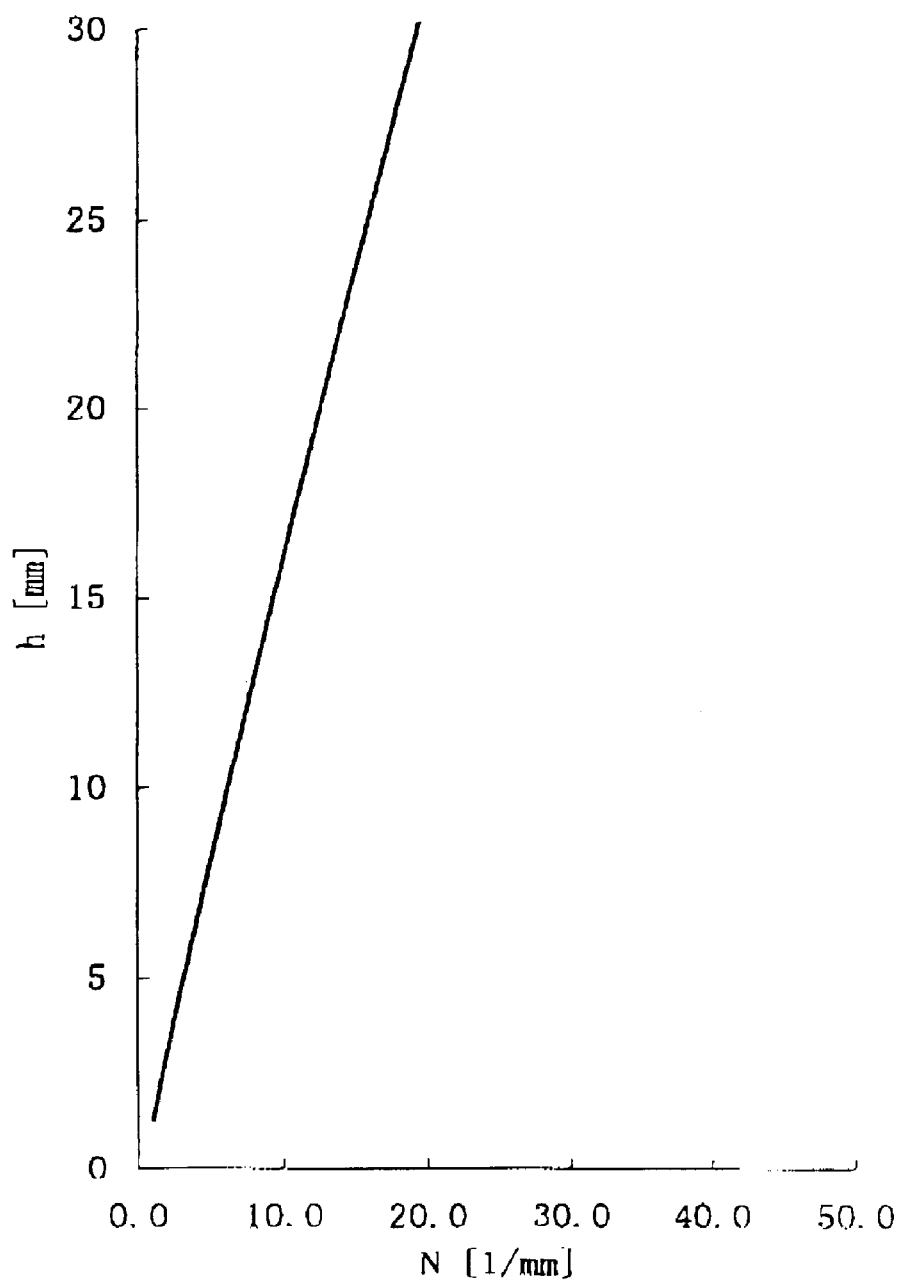
FIG. 13 is a graph showing the distribution of pitch of steps which form the diffractive structure of the lens shown in FIG. 11.
Figure 14:
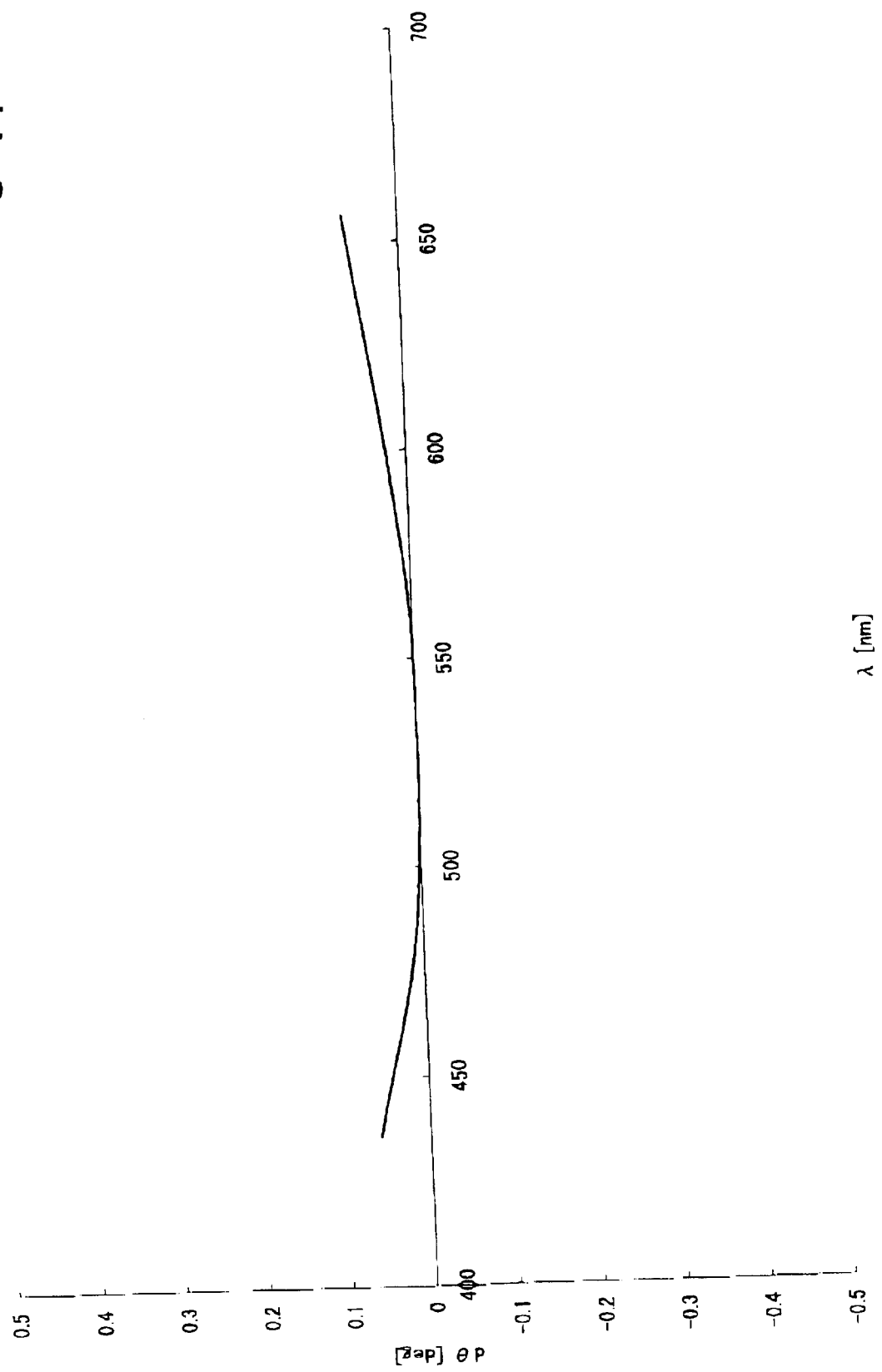
FIG. 14 is a graph showing the chromatic aberration caused by the third embodiment of the spectacle lens shown in FIG. 11.
Figure 34:
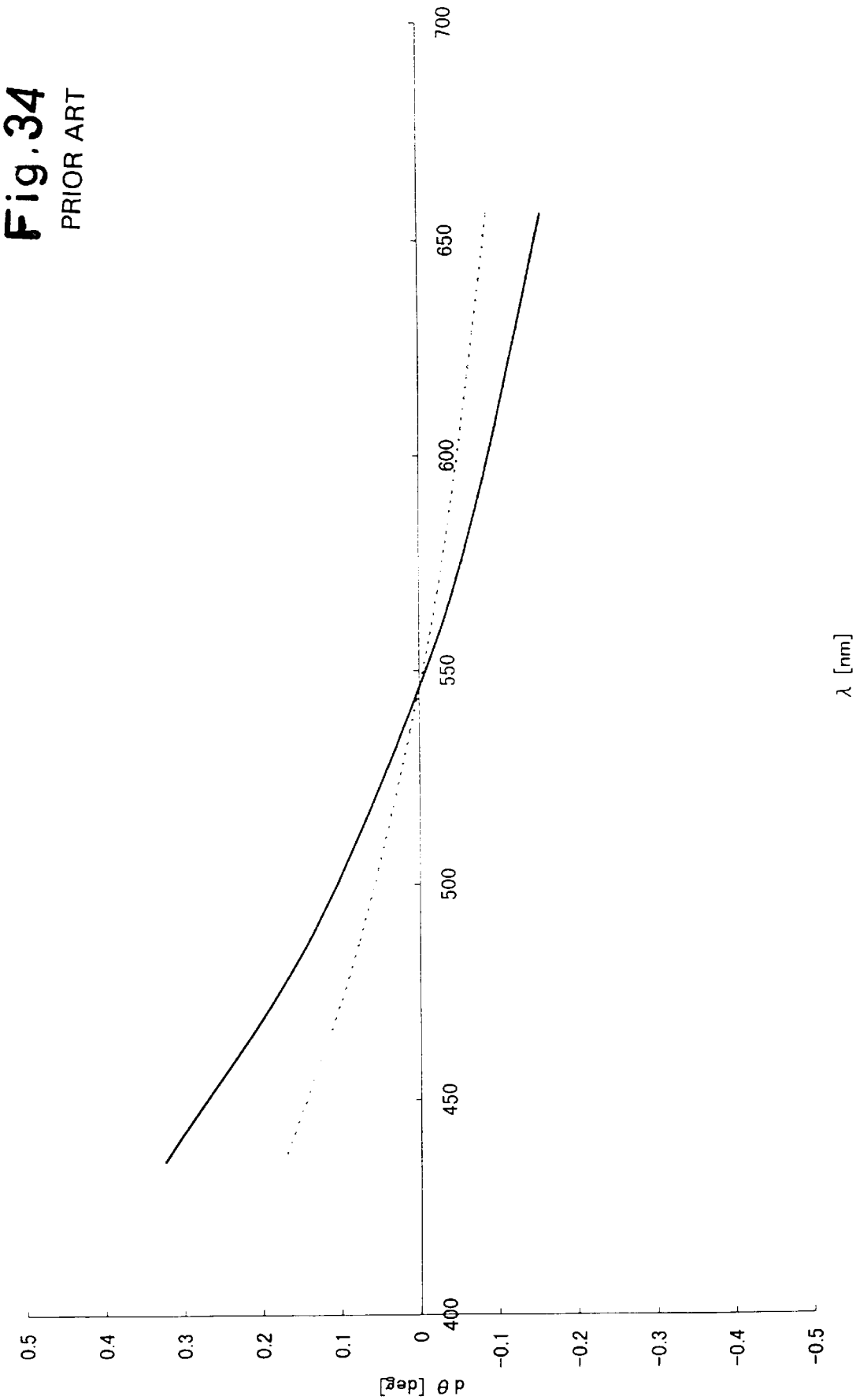
FIG. 34 is a graph showing respective chromatic aberration of magnification caused by another two different types conventional spectacle lenses.

FIG. 11 shows a cross sectional view of the third embodiment of the spectacle lens 10. In this third embodiment, a front view of the spectacle lens 10 is omitted. In FIG. 11 the dimensions of the stepped portions drawn on the front surface 11 are greatly enlarged (exaggerated) from their actual size so that the stepped portions can be clearly seen. Therefore, the actual stepped portions formed on the front surface 11 are too minute to be seen by the naked eye. FIG. 12 is an enlarged cross sectional view of part of the front surface 11 which is located about a position approximately 20 mm away from the optical axis of the lens 10. The pitch of the stepped portions of the diffractive structure varies depending on the location (distance h from the optical axis) on the front surface 11, as can be seen from FIG. 13. FIG. 14 shows the transverse chromatic aberration in the case of viewing through the third embodiment of the specific spectacle 10 in a direction with a visual angle of 50 degrees. Upon comparing this third embodiment of the spectacle lens 10 with the fourth prior art (the aforementioned conventional spectacle lens) whose chromatic aberration is shown by solid lines in FIG. 34 and which is made of material identical to the material of the third embodiment of the spectacle lens 10, it can be appreciated that the chromatic aberration caused by this third embodiment of the spectacle lens 10 is greatly reduced.

Fourth Embodiment

The fourth embodiment of a spectacle lens 10 is made of a lens material having a refractive index of 1.66 and Abbe number of 32. This spectacle lens 10 is provided on a rear surface 12 thereof with a surface relief diffractive structure consisting of concentrically-arranged minute circular stepped portions (a series of concentric rings or annular steps) to correct chromatic aberration. The vertex power of the lens 10 is +4.00 (diopter). The optical center thickness tc and the rim thickness te of the lens 10 are 4.31 (mm) and 1.236 (mm), respectively.

Figure 15:
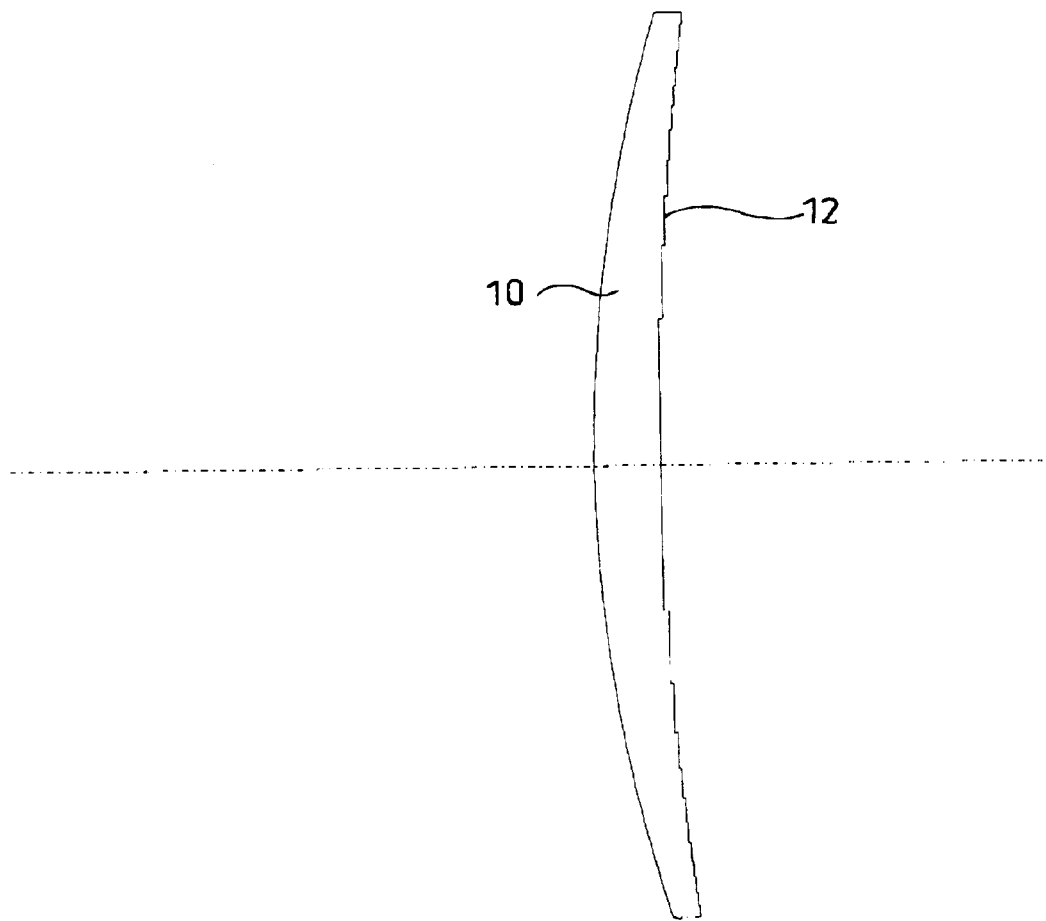
FIG. 15 is a cross sectional view of a fourth embodiment of a spectacle lens according to a first aspect of the present invention, wherein a diffractive structure formed on the rear surface of the spectacle lens is exaggeratively shown.
Figure 16:
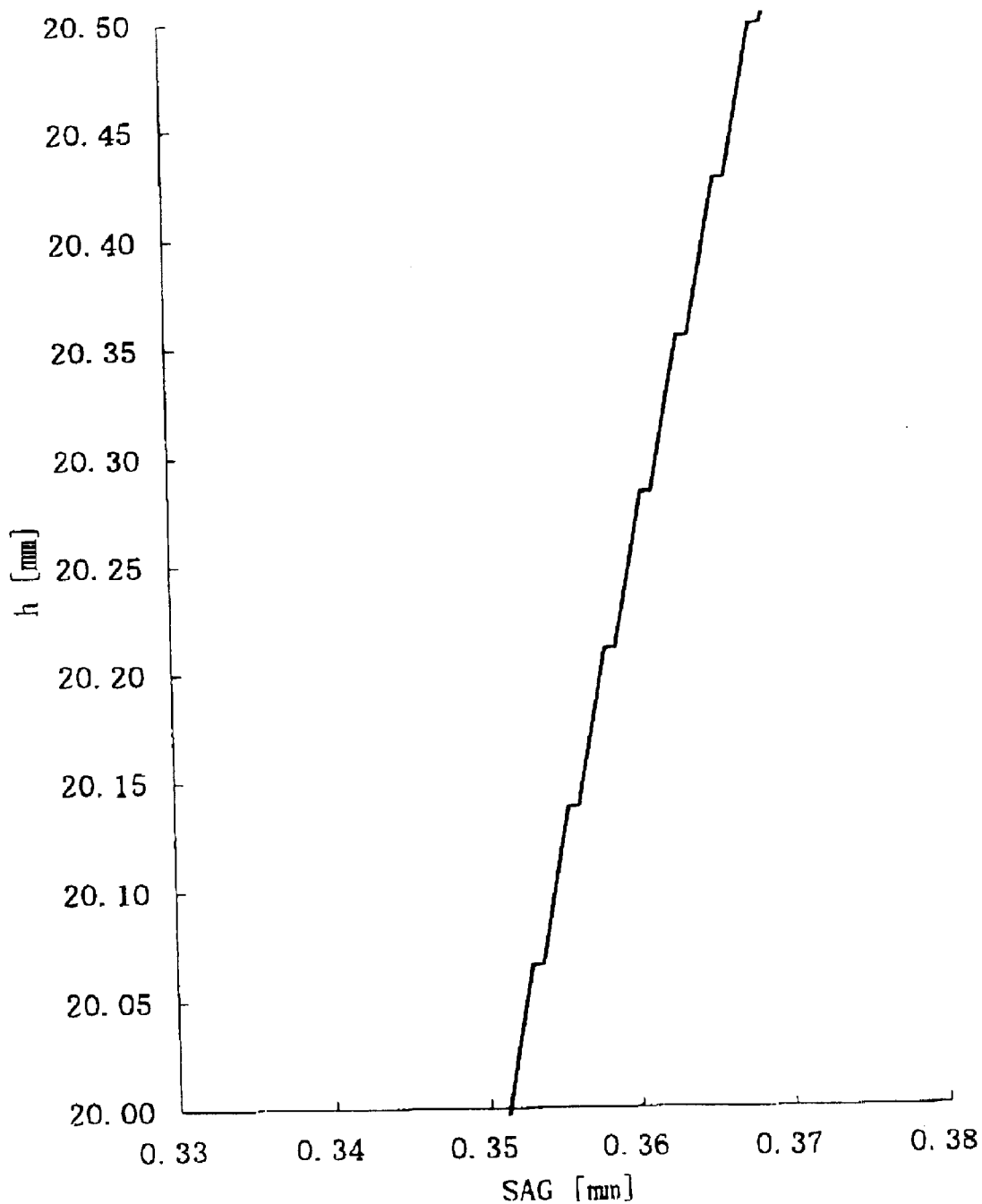
FIG. 16 is an enlarged cross sectional view of a part of the rear surface of the spectacle lens shown in FIG. 15.
Figure 17:
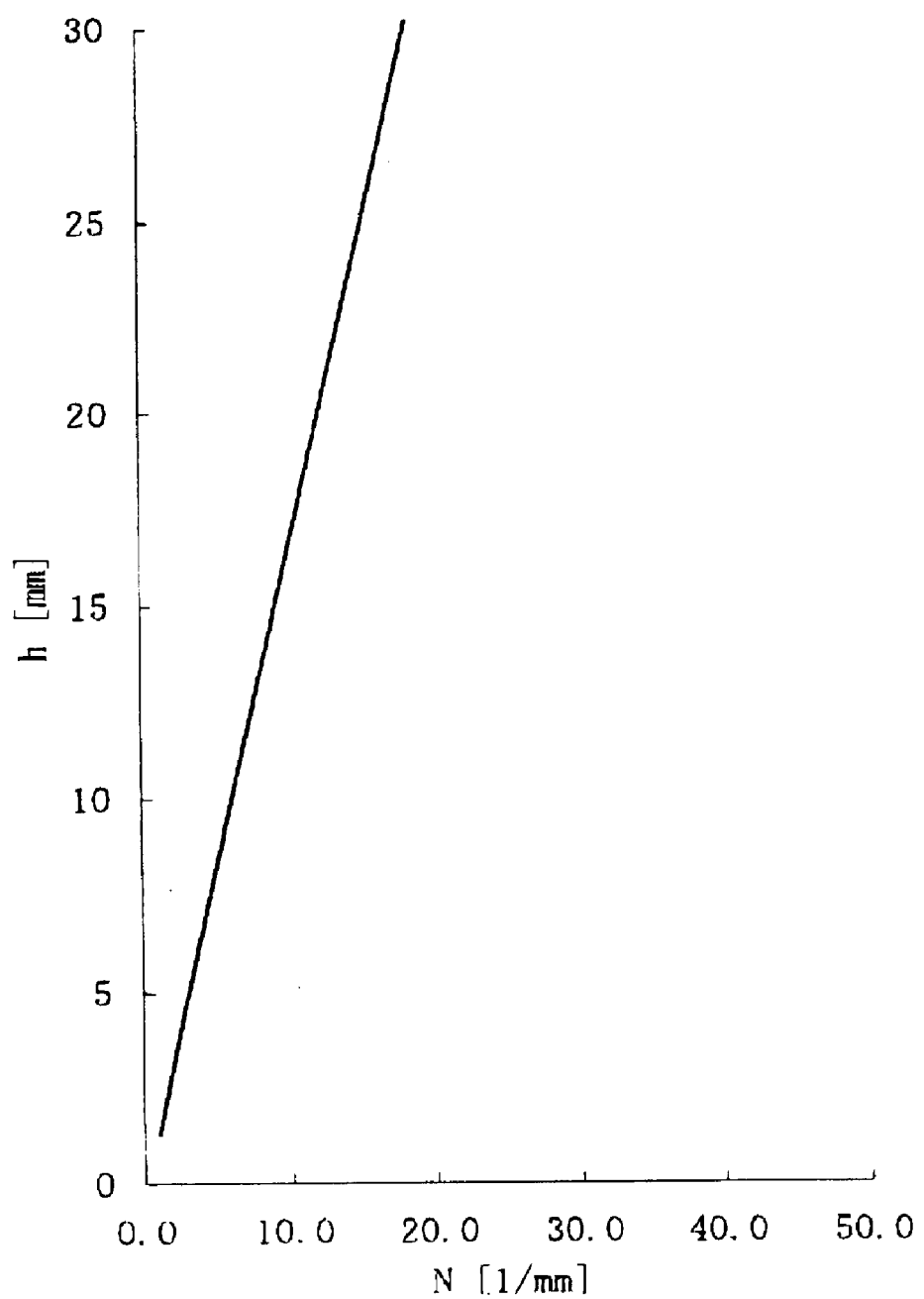
FIG. 17 is a graph showing the distribution of pitch of steps which form the diffractive structure of the lens shown in FIG. 15.
Figure 18:
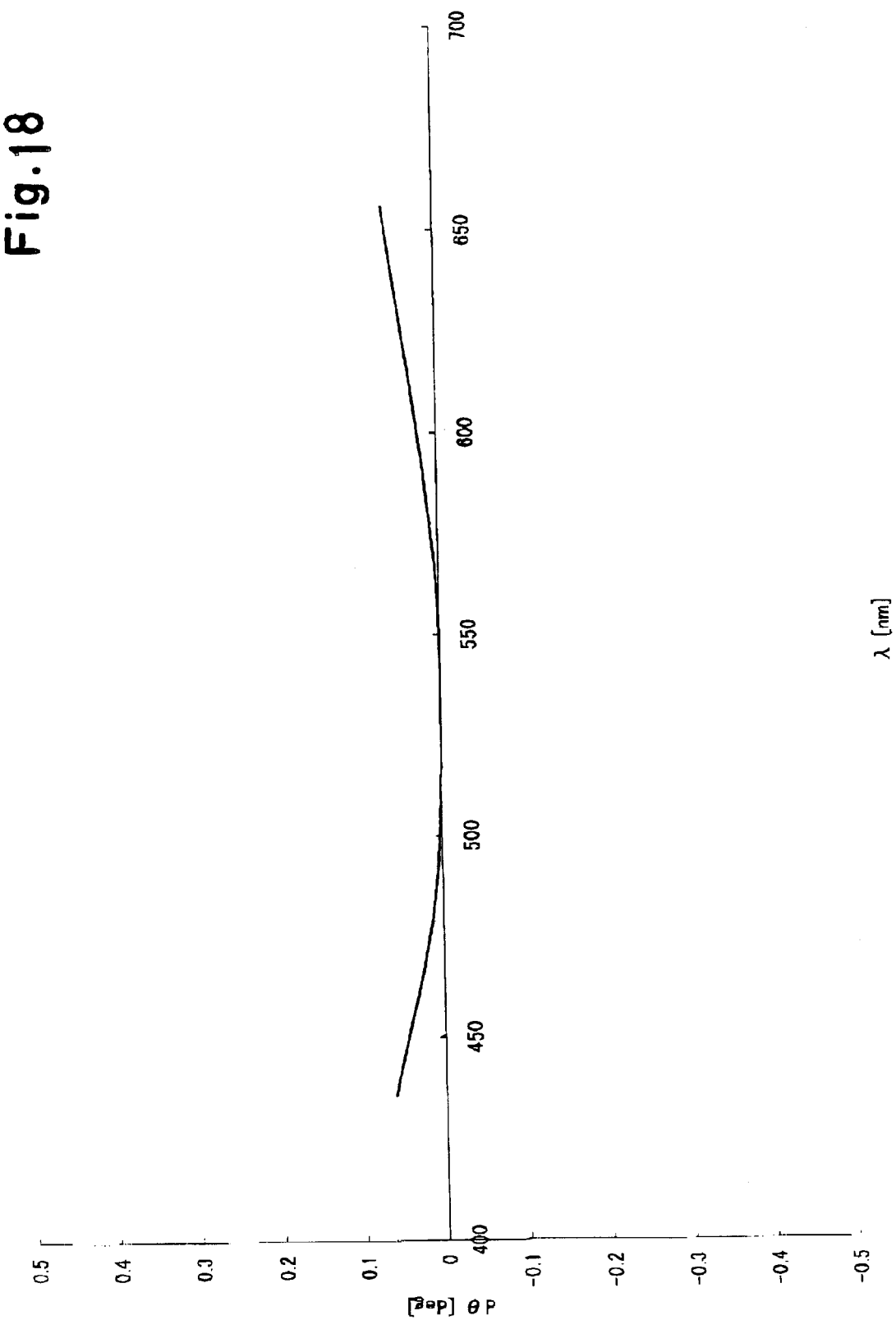
FIG. 18 is a graph showing the chromatic aberration caused by the fourth embodiment of the spectacle lens shown in FIG. 15.

FIG. 15 shows a cross sectional view of the fourth embodiment of the spectacle lens 10. In this fourth embodiment, a front view of the spectacle lens 10 is omitted. In FIG. 15, the dimensions of the stepped portions drawn on the rear surface 12 are greatly enlarged (exaggerated) in size from their actual size so that the stepped portions can be clearly seen. Therefore, the actual stepped portions formed on the rear surface 12 are too minute to be seen by the naked eye. FIG. 16 is an enlarged cross sectional view of part of the rear surface 12 which is located about a position approximately 20 mm away from the optical axis of the lens 10. The pitch of the stepped portions of the diffractive structure varies depending on the location (distance h from the optical axis) on the rear surface 12, as can be seen from FIG. 17. FIG. 18 shows the transverse chromatic aberration in the case of viewing through the third embodiment of the specific spectacle 10 in a direction with a visual angle of 50 degrees. Upon comparing this fourth embodiment of the spectacle lens 10 with the fourth prior art (the aforementioned conventional spectacle lens) whose chromatic aberration is shown by solid line in FIG. 34 and which is made of a material identical to the material of the third embodiment of the spectacle lens 10, it can be appreciated that the chromatic aberration caused by this fourth embodiment of the spectacle lens 10 is greatly reduced.

Fifth Embodiment

The fifth embodiment of a spectacle lens 20 according to the second aspect of the present invention will be hereinafter discussed. This spectacle lens 20 is provided on a rear surface thereof with a layer 21 having a predetermined refractive index profile to form a diffractive structure.

Figure 20:
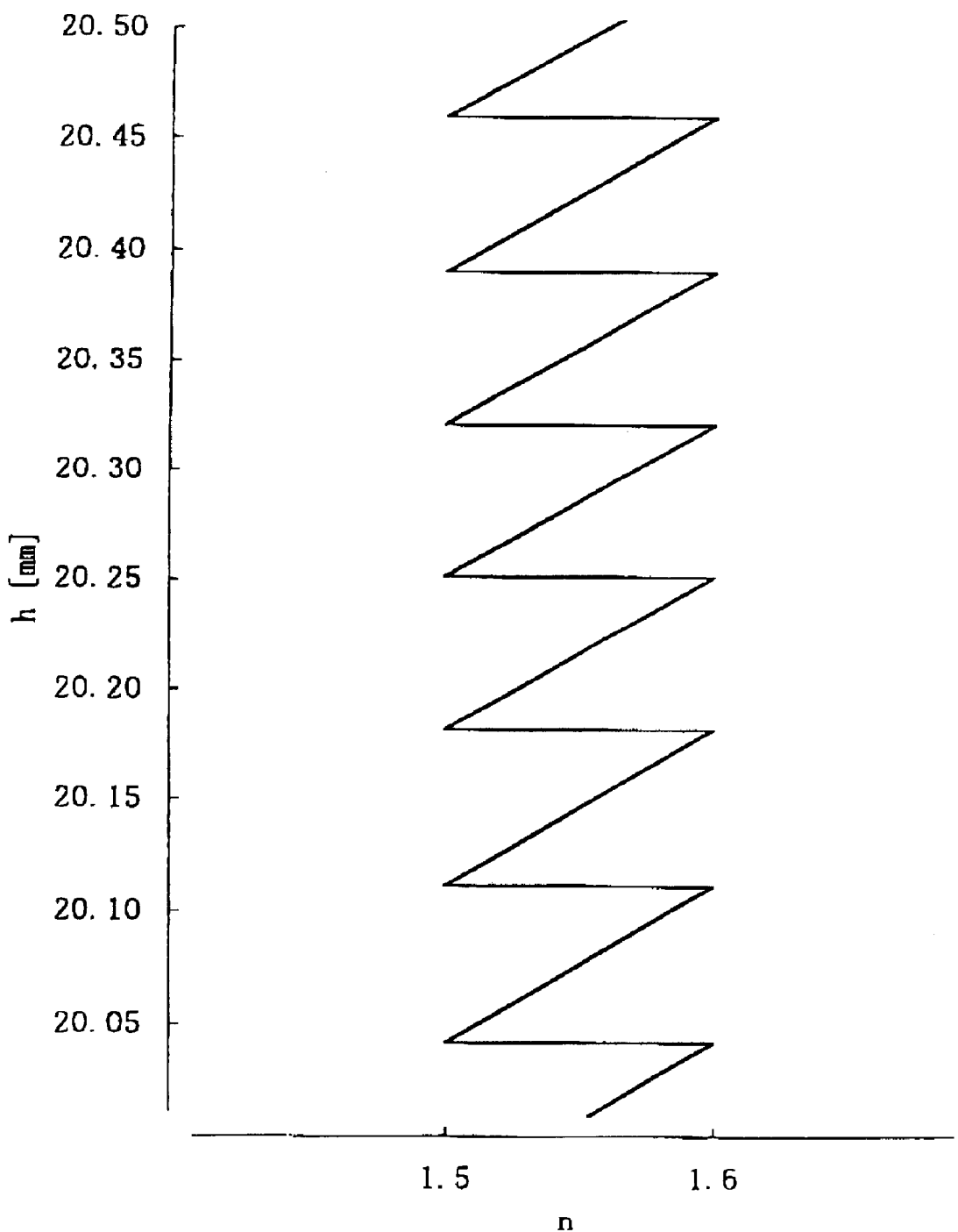
FIG. 20 is a graph showing the distribution of refractive index of part of the diffractive structure formed on the rear surface of the spectacle lens shown in FIG. 19.
Figure 21:
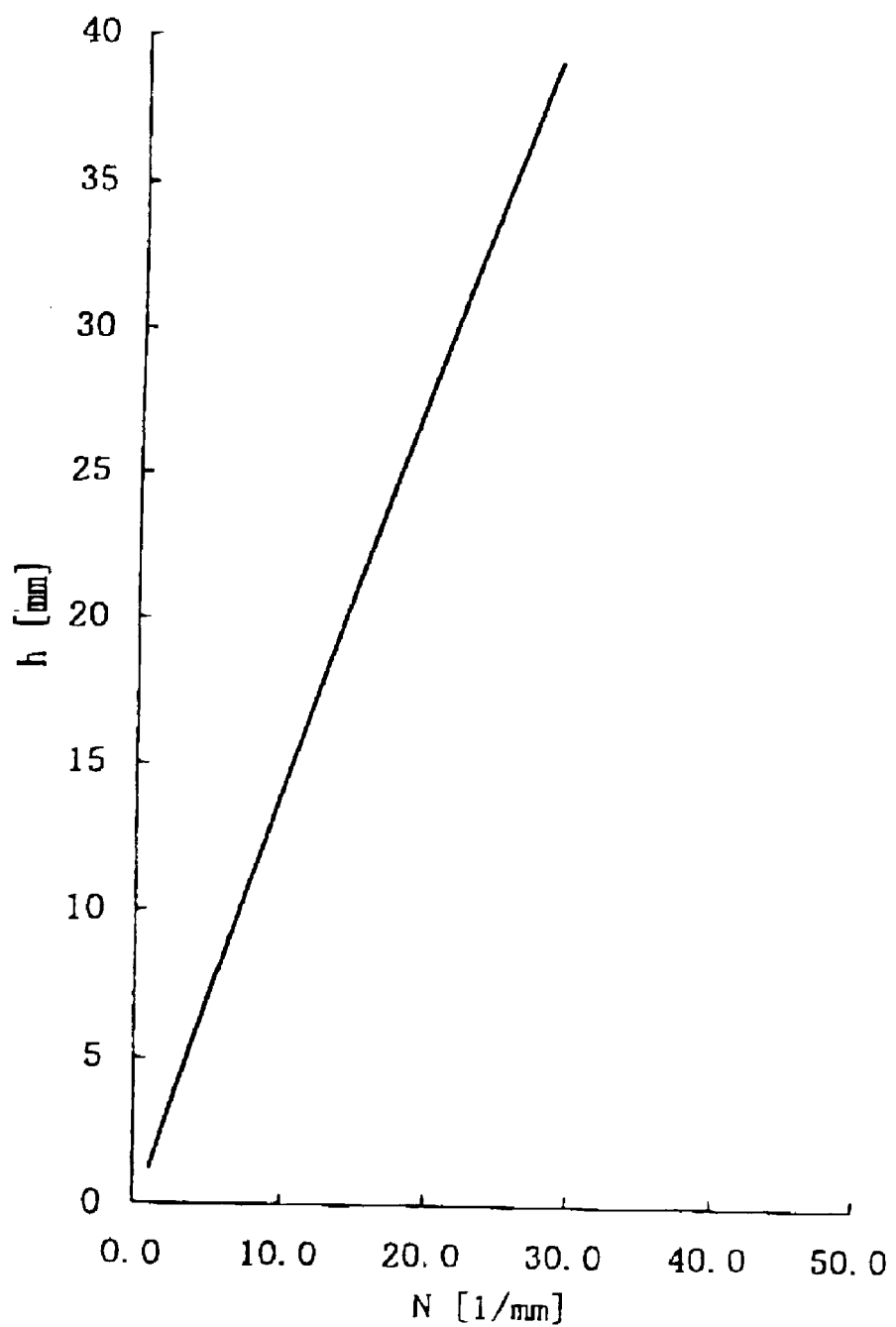
FIG. 21 is a graph showing the distribution of pitch of concentric rings which form the diffractive structure of the lens shown in FIG. 19.

The spectacle lens 20 is made of a lens material having the refractive index of 1.60 and Abbe number of 36. The vertex power of the lens 20 is +4.00 (diopter). The layer 21 consists of the great number of concentrically-arranged circular rings (a series of concentric rings) to correct chromatic aberration. FIG. 20 shows the distribution of refractive index (refractive index profile) of part of the diffractive structure, formed on the rear surface of the spectacle lens 20, about a position approximately 20 mm away form the optical axis of the spectacle lens 20. As can be seen from FIG. 20, the layer 21 has a jagged distribution of refractive index. Therefore, the refractive index of each of the concentric rings varies at different points thereon. The range of variation of the refractive index of each of the concentric rings is approximately 0.1. The thickness of the layer 21 is approximately 6 µm.

Figure 19:
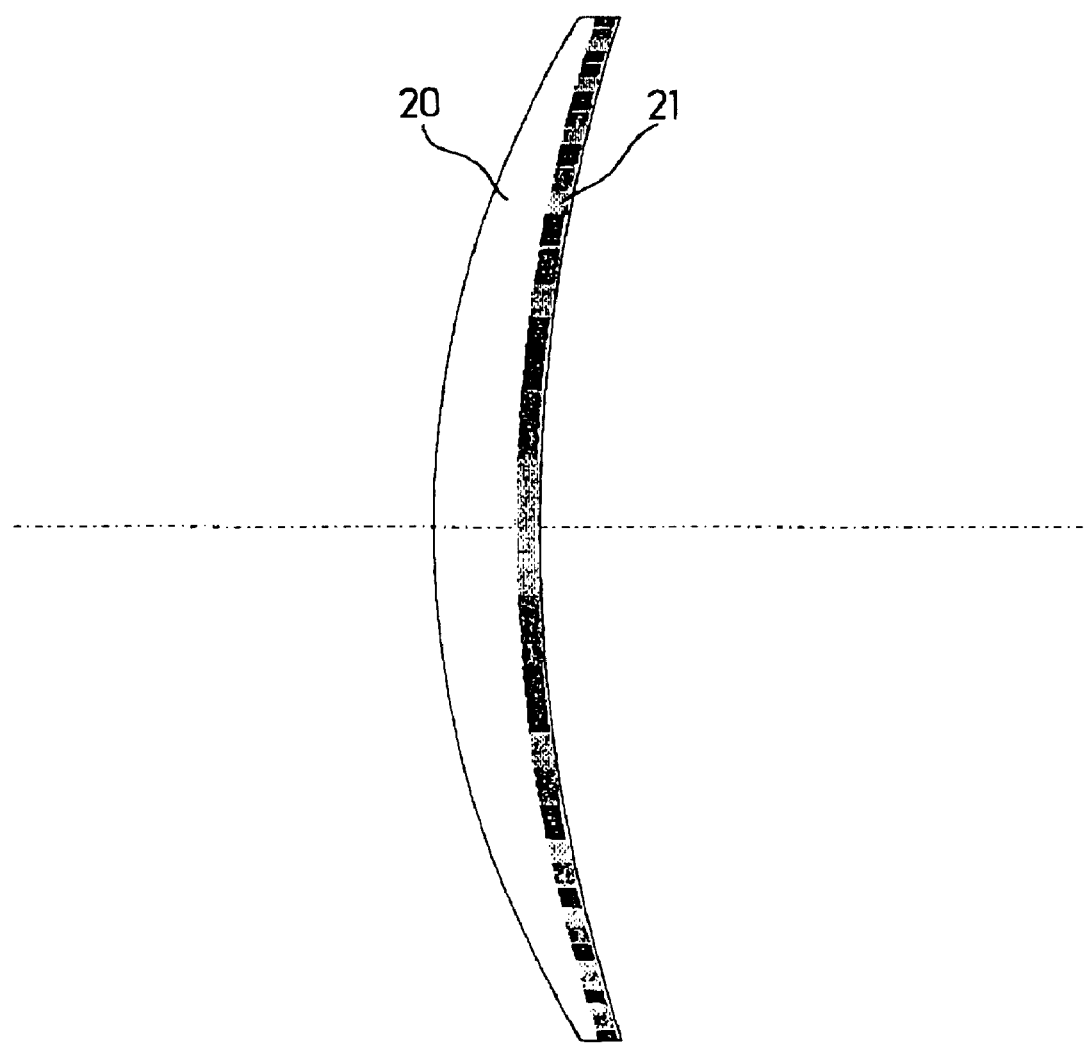
FIG. 19 is a cross sectional view of a fifth embodiment of a spectacle lens according to a second aspect of the present invention, wherein a diffractive structure formed on the rear surface of the spectacle lens is exaggeratively shown.

In FIG. 19, the thickness of the layer 21, is greatly enlarged (exaggerated) from tis actual size. The actual thickness is much smaller. The degrees of the pitch of the concentric rings are represented by the difference in brightness. Namely, the brighter a portion of the layer 21 is indicated, the greater the pitch of the concentric rings are.

Figure 22:
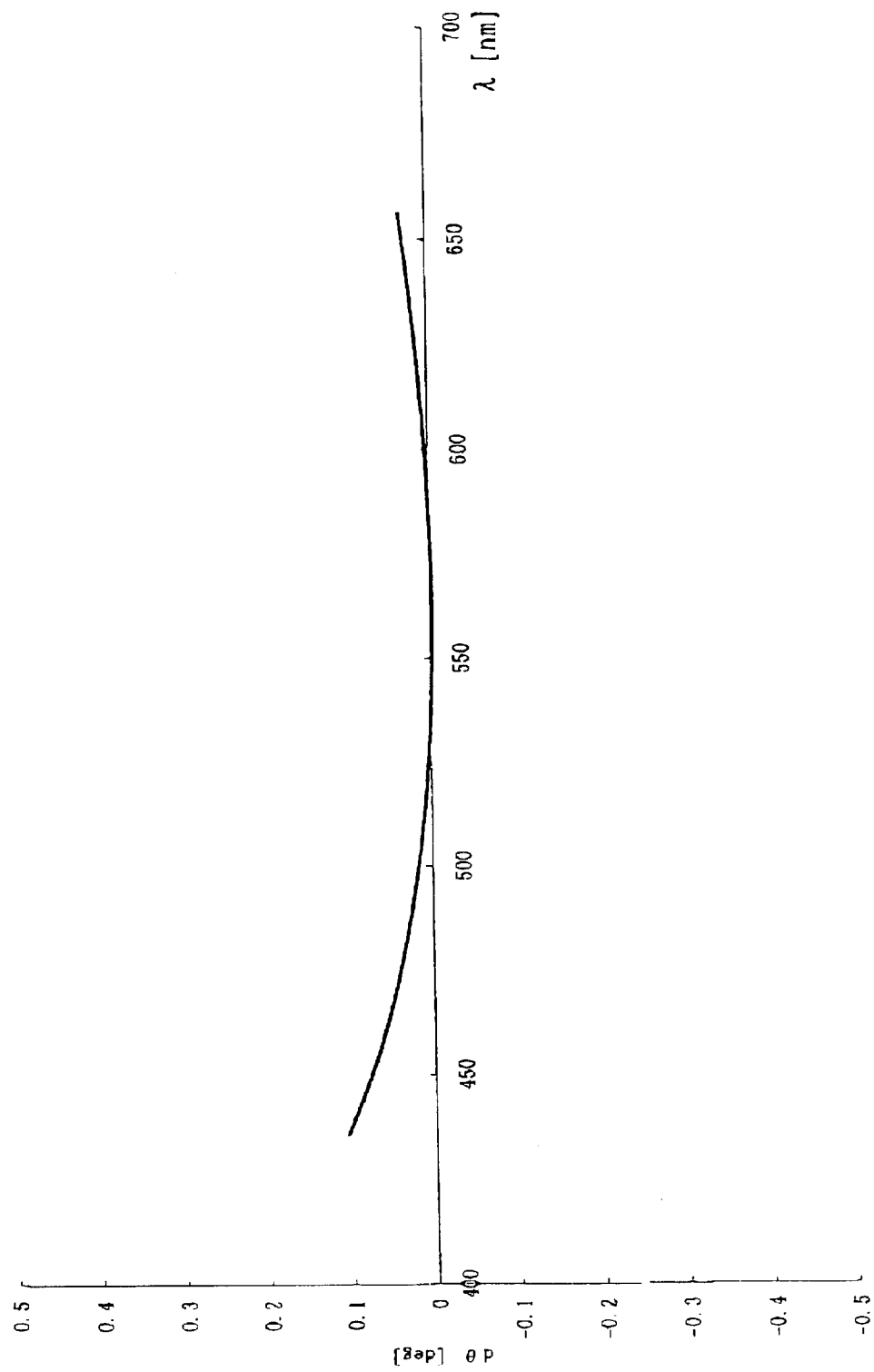
FIG. 22 is a graph showing the chromatic aberration caused by the fifth embodiment of the spectacle lens shown in FIG. 19.

The pitch and depth of the concentric rings of the diffractive structure are very small as can be appreciated from FIG. 20. The pitch p of the concentric rings becomes smaller as the distance h from the optical axis increases, similarly to the case of the first embodiment shown in FIG. 4. The transverse chromatic aberration caused through peripheral portions of the lens can be effectively corrected by such a way of making the pitch of the concentric rings of the diffractive structure smaller as away from the optical axis. FIG. 22 shows the transverse chromatic aberration in the case of viewing through the fifth embodiment of the specific spectacle 20 in a direction with a visual angle of 50 degrees.

Since the surface of the layer 21 of the diffractive structure is not rugged, any surface treating can be advantageously applied to the surface of the layer 21.

Sixth Embodiment

The sixth embodiment of a spectacle lens 30 according to the third aspect of the present invention will be hereinafter discussed. This spectacle lens 30 is provided on a front surface thereof with a layer 31 having an amplitude diffractive structure. Namely, the layer 31 is formed to have a periodic transmittance to produce diffraction.

Figure 24:
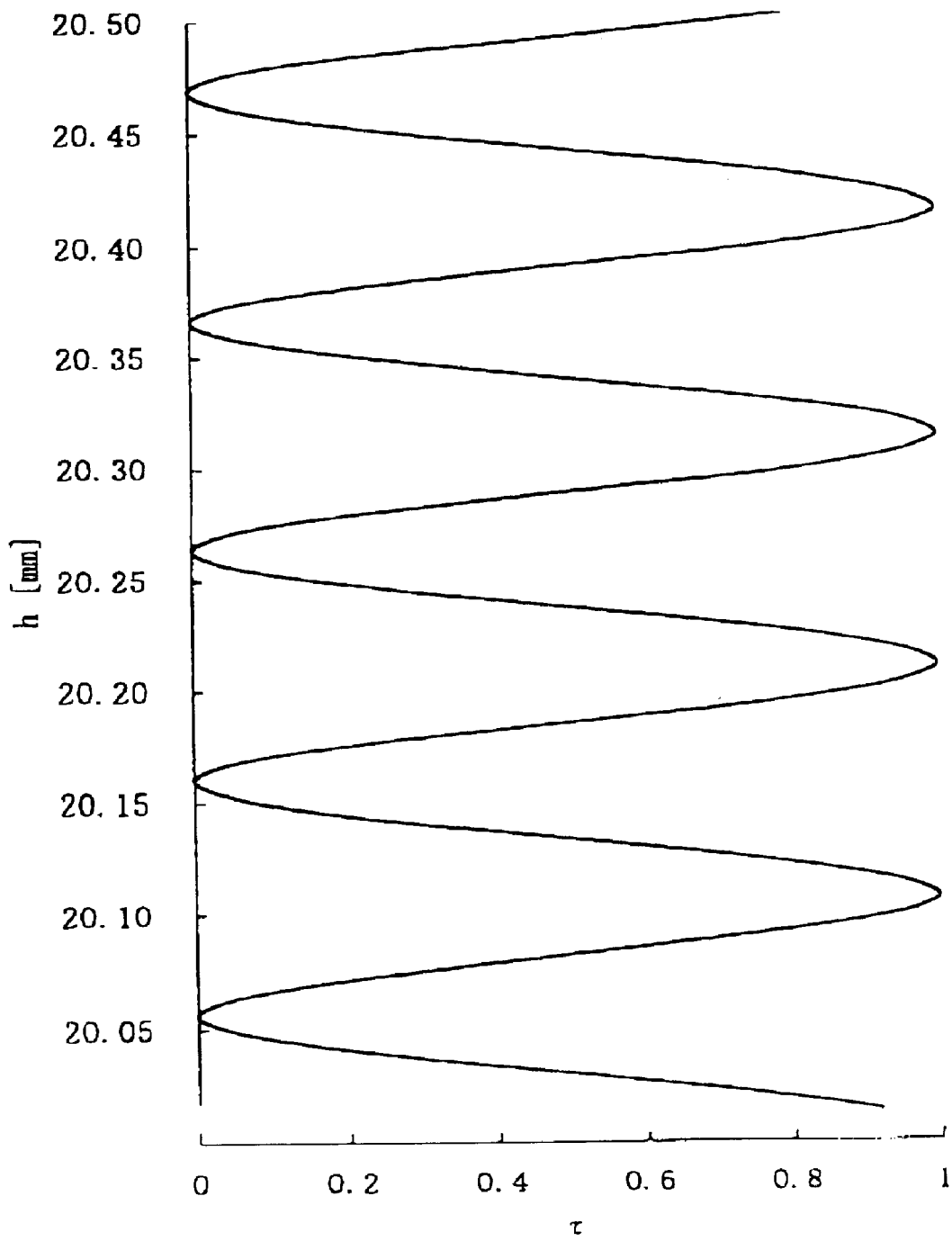
FIG. 24 is a graph showing the distribution of refractive index of part of the diffractive structure formed on the front surface of the spectacle lens shown in FIG. 23.
Figure 25:
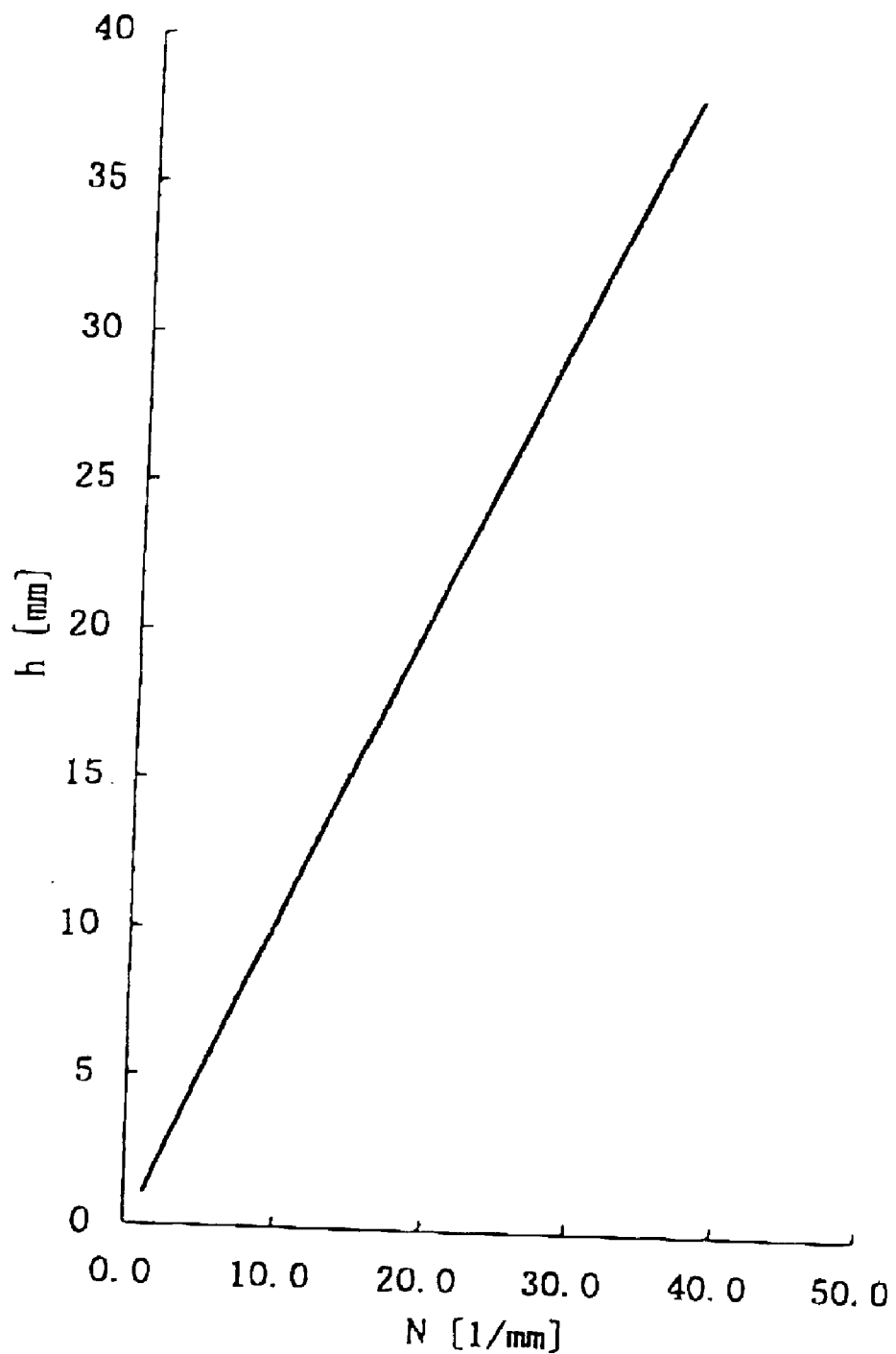
FIG. 25 is a graph showing the distribution of pitch of concentric rings which form the diffractive structure of the lens shown in FIG. 23.

The spectacle lens 30 is made of a lens material having a refractive index of 1.66 and Abbe number of 32. The layer 31 consists of the great number of concentrically-arranged circular rings (a series of concentric rings) to correct chromatic aberration. FIG. 24 shows the distribution of refractive index (refractive index profile) of part of the diffractive structure, formed on the front surface of the spectacle lens 30, about a position approximately 20 mm away from the optical axis of the spectacle lens 30. As shown in FIG. 24, the transmittance of the layer 31 varies in a manner of a sine curve between zero and one.

Figure 23:
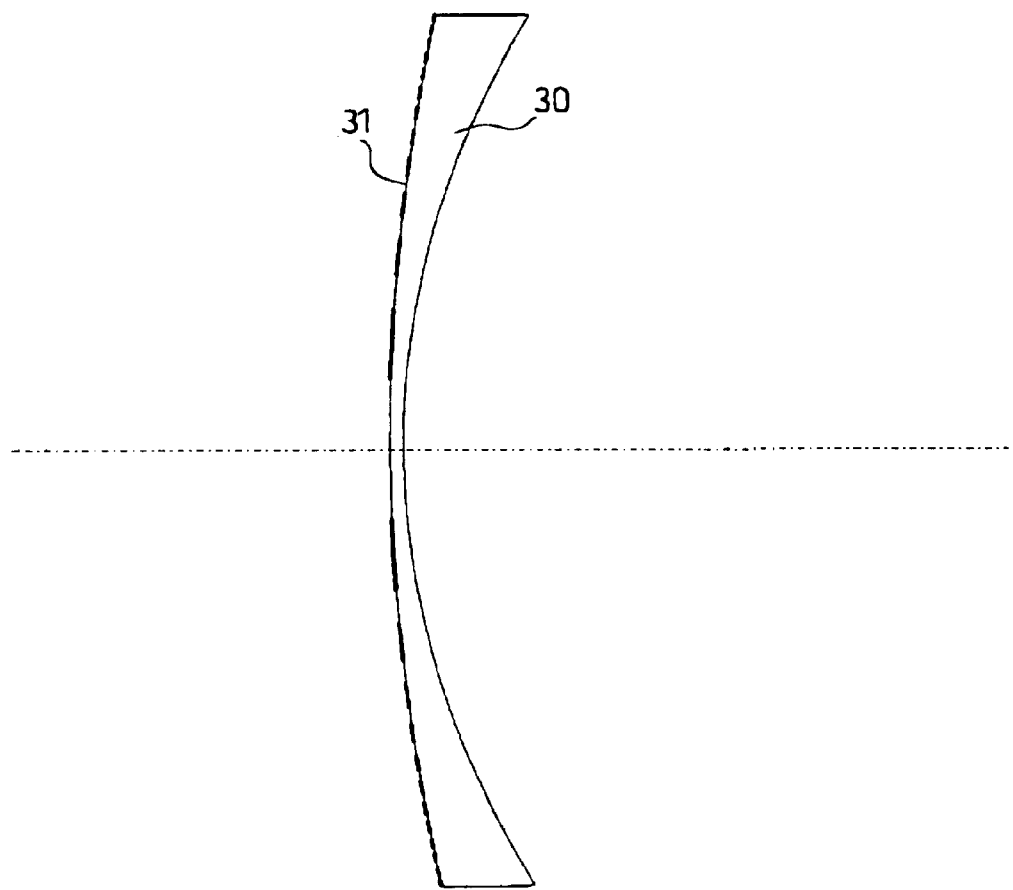
FIG. 23 is a cross sectional view of a sixth embodiment of a spectacle lens according to a third aspect of the present invention, wherein a diffractive structure formed on the front surface of the spectacle lens is exaggeratively shown.
Figure 26:
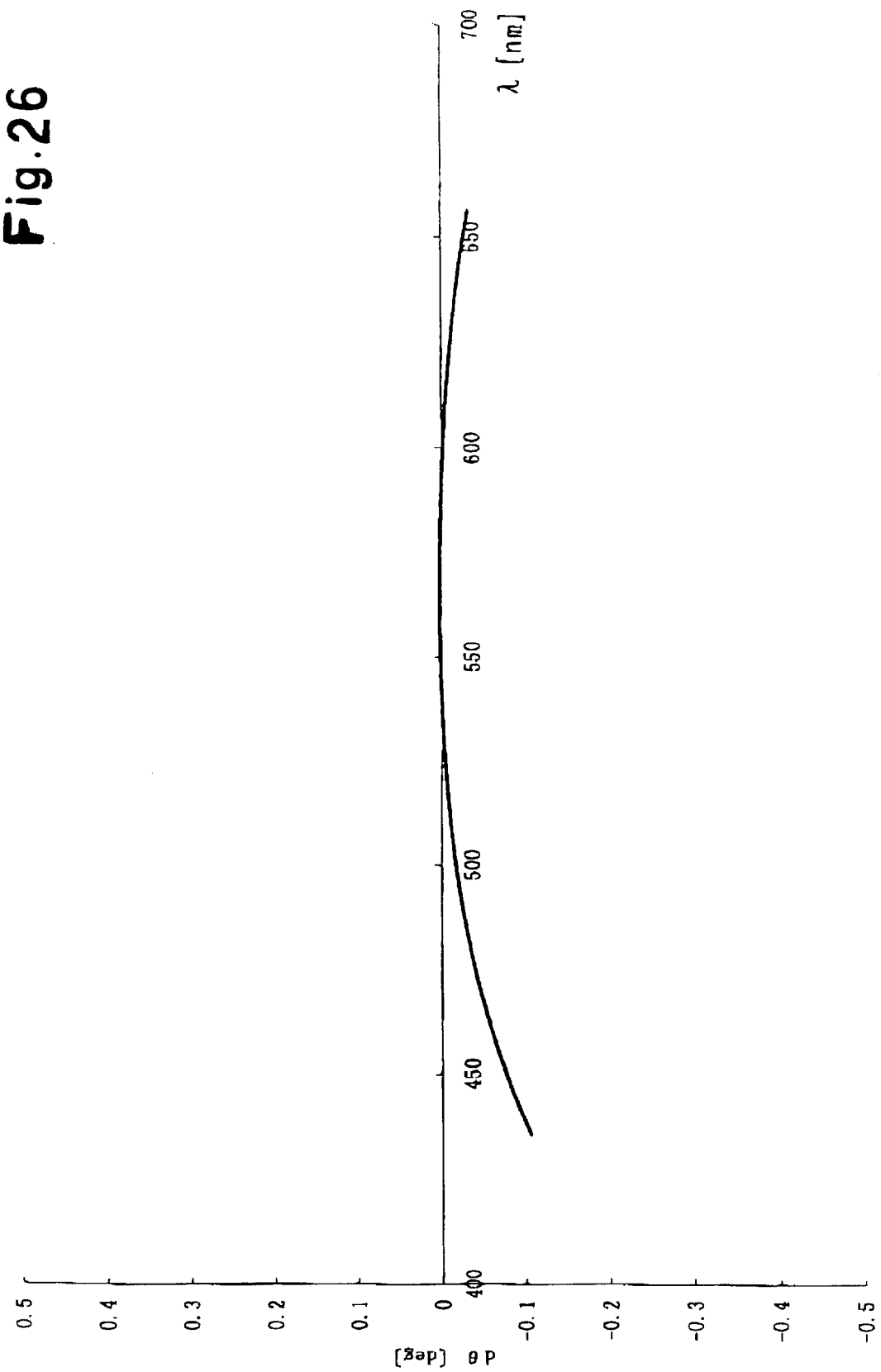
FIG. 26 is a graph showing the chromatic aberration caused by the sixth embodiment of the spectacle lens shown in FIG. 23.

In FIG. 23 the pitch of the concentric rings of the layer 31 drawn on the front surface of the lens 30 is greatly enlarged (exaggerated) from its actual size. The actual pitch is very small as can be understood from FIG. 24. The pitch p of the concentric rings becomes smaller as the distance h from the optical axis increases, similarly to the case of the second embodiment shown in FIG. 7. The transverse chromatic aberration caused through peripheral portions of the lens can be effectively corrected by such a way of making the pitch of the concentric rings of the diffractive structure smaller in a direction away from the optical axis. FIG. 26 shows the transverse chromatic aberration in the case of viewing through the sixth embodiment of the specific spectacle 30 in a direction with a visual angle of 50 degrees.

Figure 33:
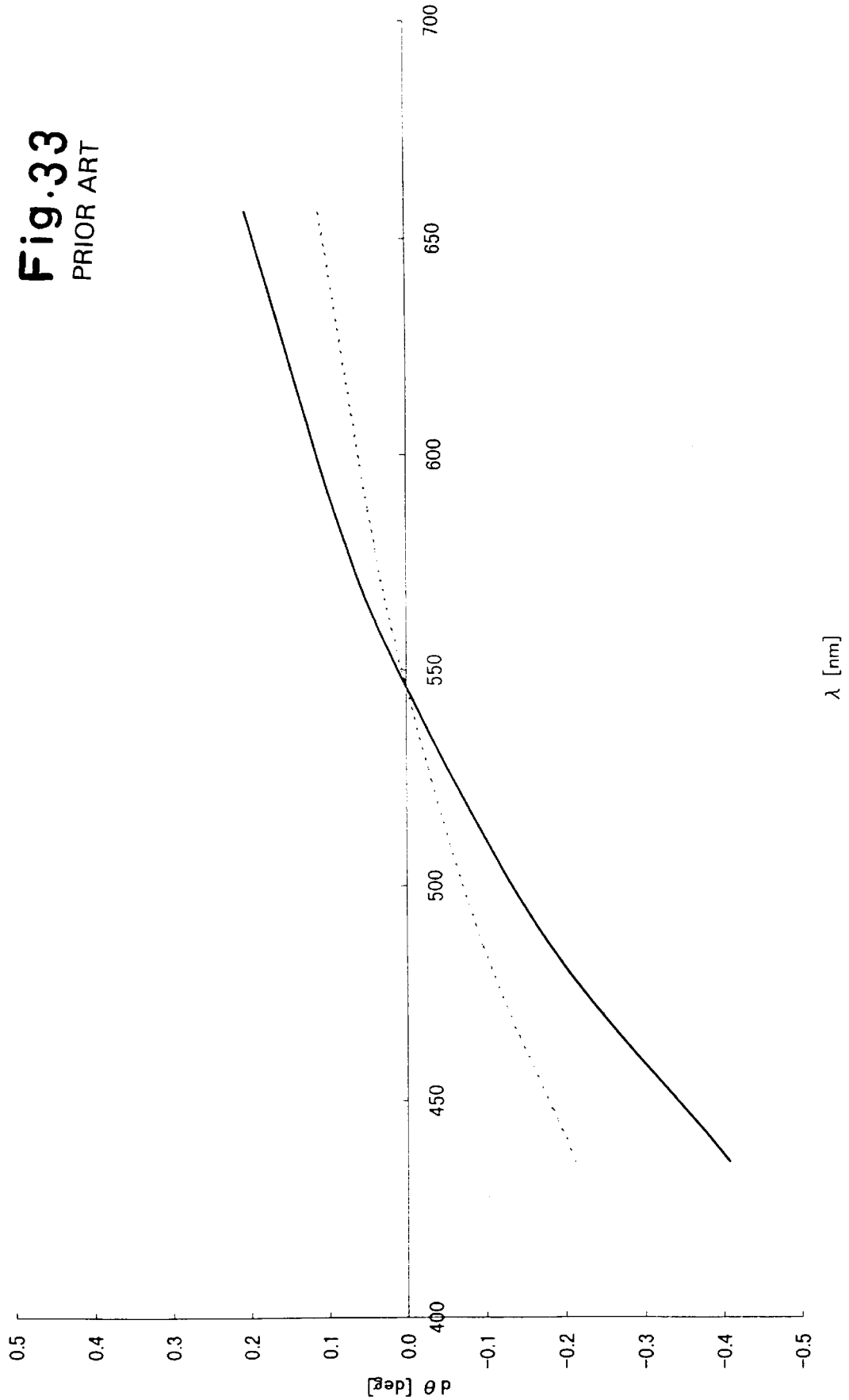
FIG. 33 is a graph showing respective chromatic aberrations of magnification caused by two different types of conventional spectacle lenses.

As compared this sixth embodiment of the spectacle lens 30 with the second prior art (the aforementioned conventional spectacle lens) whose chromatic aberration is shown by solid line in FIG. 33 and which is made of a material identical to the material of the sixth embodiment of the spectacle lens 30, it can be appreciated that the chromatic aberration caused by this sixth embodiment of the spectacle lens 30 is greatly reduced.

Since the surface of the layer 31 of diffractive structure is not rugged, any surface treating can be advantageously applied to the surface of the layer 31. Furthermore, the average transmittance of the layer 31 is less than 25 percent, so that the sixth embodiment of the spectacle lens 30 is preferably used for sun glasses.

Each of the aforementioned first through sixth embodiments satisfies all the aforementioned conditions (1) through (4). Each of the first through fourth embodiments further satisfies the aforementioned fifth condition (5). The first and third embodiments further satisfy the aforementioned conditions (6), (7) and (8). The second and fourth embodiments further satisfy the aforementioned conditions (6), (7) and (9).

As can be understood from the foregoing, according to the present invention, a spectacle lens causing less transverse chromatic aberration can be realized even if the Abbe number of the spectacle lens is small (i.e., the dispersive power of the spectacle lens is large). According to the present invention, since it is not necessary to combine more than one lens element having different Abbe numbers to correct chromatic aberration, a light-weight spectacle lens can be easily realized.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A spectacle lens comprising:

a diffractive structure for producing diffraction to correct transverse chromatic aberration that is caused by a macroscopic surface shape of said spectacle lens;

wherein said diffractive structure comprises a series of rings formed integral with said spectacle lens; and wherein providing that the Abbe number of a material of which said spectacle lens is made and the prism power at any one point on said series of rings within a radius of at least 30 mm about the geometric center of said spectacle lens are represented by $\nu$ and P (prism diopter), respectively, a pitch p(mm) of said series of rings satisfies the following condition (1):

$$p < 0.04\nu/|P| \tag{1}$$

2. The spectacle lens according to claim 1, wherein said pitch p(mm) satisfies the following conditions (3):

$$p > 0.005 \tag{3}$$

3. The spectacle lens according to claim 1, wherein said Abbe number $\nu$ satisfies the following condition (4):

$$\nu < 45 \tag{4}$$

4. The spectacle lens according to claim 3, wherein said optical material is plastic.

5. A spectacle lens comprising:

a diffractive structure for producing diffraction to correct transverse chromatic aberration that is caused by a macroscopic surface shape of said spectacle lens;

wherein said diffractive structure comprises a series of rings formed integral with said spectacle lens; and wherein said series of rings are formed as a series of concentric rings; and wherein a pitch p(mm) of said concentric rings at any one point on said series of concentric rings within a distance h of at least 30 mm from an optical axis of said spectacle lens satisfies the following condition (2)

$$p < 0.4\nu/|D \times h| \tag{2}$$

wherein:

ν represents the Abbe number of a material of which said spectacle lens is made; and D represents the vertex power (diopter) of said spectacle lens along a cross section including said any one point and said optical axis.

6. The spectacle lens according to claim 5, wherein said pitch p(mm) satisfies the following condition (3):

$$p > 0.005 \tag{3}.$$

7. The spectacle lens according to claim 5, wherein said Abbe number ν satisfies the following condition (4):

$$\nu < 45 \tag{4}.$$

8. The spectacle lens according to claim 7, wherein said optical material is plastic.

9. A spectacle lens comprising:

a diffractive structure for producing diffraction to correct transverse chromatic aberration that is caused by a macroscopic surface shape of said spectacle lens;

wherein said diffractive structure comprises a series of rings formed integral with said spectacle lens;

wherein said diffractive structure is formed such that a stepped surface which comprises a series of annular steps respectively forming said series of rings is formed microscopically on a front surface of said spectacle lens;

wherein providing that the incident angle of a light ray incident on said front surface at any one point thereon within a radius of at least 30 mm about the geometric center of said spectacle lens is represented by θ (°); that the angle of refraction of a light ray refracted through said front surface at said any one point thereon is represented by θ' (°); and that the height of a rise of one of said series of annular steps at said any one point in a direction of a normal extending from an annular surface of said one of said series of annular steps is represented by Δ (mm), for any one of light rays having a wavelength λ (mm) within a range of 5×10⁻⁴ (through 6×10⁻⁴, the following equation (5) is satisfied:

$$\Delta = |\lambda/(\cos\theta - n_\lambda \cos\theta')| \tag{5};$$

wherein $n_\lambda$ represents the refractive index of a lens material of said spectacle lens relative to said wavelength λ.

10. A spectacle lens comprising:

a diffractive structure for producing diffraction to correct transverse chromatic aberration that is caused by a macroscopic surface shape of said spectacle lens;

wherein said diffractive structure comprises a series of rings formed integral with said spectacle lens;

wherein said diffractive structure is formed such that a stepped surface which comprises a series of annular steps respectively forming said series of rings is formed microscopiocally on a front surface of said spectacle lens;

wherein said spectacle lens is a single-vision lens; and wherein providing, at any one point on said front surface within a radius h of at least 30 mm about the geometric center of said spectacle lens, that the angle of a normal extending from an annular surface of one of said series of annular steps on said front surface at said any one point thereof relative to an optical axis of said spectacle lens is represented by γ (°) and that the height of a rise of one of said series of annular steps at said any one point in a direction of said normal is represented by Δ (mm), for any one of light rays having a wavelength λ (mm) within a range of 5'10⁻⁴ through 6×10⁻⁴, the following conditions (6) and (7) are satisfied:

$$|\lambda/[\cos\psi - n_\lambda \cos\{\sin^{-1}(\sin\psi/n_\lambda)\}]| - 1\times 10^{-5}\times h < \Delta \tag{6}$$

$$\Delta < |\lambda/[\cos\psi - n_\lambda \cos\{\sin^{-1}(\sin\psi/n_\lambda)\}]| + 1\times 10^{-5}\times h \tag{7}$$

wherein ψ is expressed by the following equation (8):

$$\psi = \tan^{-1}(h/25) - 180Dh/1000\pi - \gamma \tag{8};$$

and wherein:

$n_\lambda$ represents the refractive index of a lens material of said spectacle lens relative to said wavelength λ; and D represents the vertex power (diopter) of said spectacle lens along a cross section including said any one point and said optical axis.

11. The spectacle lens according to claim 10, wherein said spectacle lens is a negative lens, and wherein said series of annular steps are formed such that each of rises of said series of annular steps extends to decrease the thickness of said spectacle lens in a radial direction from an innermost annular step toward an outermost annular step of said series of annular steps.

12. The spectacle lens according to claim 10, wherein said spectacle lens is a positive lens, and wherein said series of annular steps are formed such that each of rises of said series of annular steps extends to increase the thickness of said spectacle lens in a radial direction from an innermost annular step toward an outermost annular step of said series of annular steps.

13. A spectacle lens comprising:

a diffractive structure for producing diffraction to correct transverse chromatic aberration that is caused by a macroscopic surface shape of said spectacle lens;

wherein said diffractive structure comprises a series of rings formed integral with said spectacle lens;

wherein said diffractive structure is formed such that a stepped surface which comprises a series of annular steps repetitively forming said series of rings is formed microscopically on a rear surface of said spectacle lens; and wherein providing that the angle of a light ray incident on said rear surface at any one point thereon within a radius of at least 30 mm about the geometric center of said spectacle lens from the inside of the spectacle lens is represented by θ' (°); that the exit angle of a light ray emergent from said rear surface at said any one point is represented by θ (°); and that the height of a rise of one of said series of annular steps at said any one point in a direction of a normal extending from an annular surface of said one of said series of annular steps is represented by Δ (mm), for any one of light rays having a wavelength λ (mm) within a range of 5×10⁻⁴ through 6×10⁻⁴, the following equation (5) is satisfied:

$$\Delta = |\lambda/(\cos\theta - n_\lambda \cos\theta')| \tag{5};$$

wherein $n_\lambda$ represents the refractive index of a lens material of said spectacle lens relative to said wavelength λ.

14. A spectacle lens comprising:

a diffractive structure for producing diffraction to correct transverse chromatic aberration that is caused by a macroscopic surface shape of said spectacle lens;

wherein said diffractive structure comprises a series of rings formed integral with said spectacle lens;

wherein said diffractive structure is formed such that a stepped surface which comprises a series of annular steps repetitively forming said series of rings is formed microscopically on a rear surface of said spectacle lens;

wherein said spectacle lens is a single-vision lens; and wherein providing, at any one point on said rear surface within a radius h of at least 30 mm about the geometric center of said spectacle lens, that the angle of a normal extending from an annular surface of one of said series of annular steps on said rear surface at said any one point thereon relative to an optical axis of said spectacle lens is represented by $\gamma$ (°); and that the height of a rise of one of said series of annular steps at said any one point in a direction of said normal is represented by $\Delta$, for any one of light rays having a wavelength $\lambda$ (mm) within a range of $5\times10^{-4}$ through $6\times10^{-4}$ the following conditions (6) and (7) are satisfied:

$$|\lambda/[\cos\psi - n_\lambda \cos\{\sin^{-1}(\sin\psi/n_\lambda)\}]| - 1\times10^{-5}\times h < \Delta \quad (6)$$

$$\Delta < |\lambda/[\cos\psi - n_\lambda \cos\{\sin^{-1}(\sin\psi/n_\lambda)\}]| + 1\times10^{-5}\times h \quad (7)$$

wherein $\psi$ is expressed by the following equation (9):

$$\psi = \tan^{-1}(h/25) - \&65 \quad (9);$$

and wherein $n_\lambda$ represents the refractive index of a lens material of said spectacle lens relative to said wavelength $\lambda$.

15. The spectacle lens according to claim 14, wherein said spectacle lens is a negative lens, and wherein said series of annular steps are formed such that each of rises of said series of annular steps extends to decrease the thickness of said spectacle lens in a radial direction from an innermost annular step toward and outermost annular step of said series of annular steps.

16. The spectacle lens according to claim 14, wherein said spectacle lens is a positive lens, and wherein said series of annular steps are formed such that each of rises of said series of annular steps extends to increase the thickness of said spectacle lens in a radial direction from an innermost annular step toward an outermost annular step of said series of annular steps.

* * * * *